(12) United States Patent
Chua et al.

(10) Patent No.: US 11,446,810 B1
(45) Date of Patent: Sep. 20, 2022

(54) ROBOTIC ASSISTANT

(71) Applicant: AMAZON TECHNOLOGIES, INC., Seattle, WA (US)

(72) Inventors: Albert John Yu Sam Chua, San Jose, CA (US); Paul Leland Mandel, San Francisco, CA (US); Adam Barry Fineberg, Saratoga, CA (US); Christopher Clive Jones, San Francisco, CA (US); Stephen Anthony Kitchens, Fremont, CA (US); Christopher Lorenzo Dunn, Los Gatos, CA (US); Omar Sze Leung, Palo Alto, CA (US); Carl Philip Taussig, Woodside, CA (US); John Edwin Johnston, Redwood City, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 476 days.

(21) Appl. No.: 15/613,916

(22) Filed: Jun. 5, 2017

(51) Int. Cl.
| | |
|---|---|
| B25J 5/00 | (2006.01) |
| B25J 19/02 | (2006.01) |
| A47L 11/40 | (2006.01) |
| G05D 1/02 | (2020.01) |
| G01C 21/20 | (2006.01) |

(52) U.S. Cl.
CPC ........... *B25J 5/007* (2013.01); *A47L 11/4066* (2013.01); *B25J 19/023* (2013.01); *G01C 21/206* (2013.01); *G05D 1/0248* (2013.01)

(58) Field of Classification Search
CPC ...................................................... B25J 5/007
See application file for complete search history.

(56) References Cited

U.S. PATENT DOCUMENTS

| | | | | |
|---|---|---|---|---|
| 5,350,033 | A * | 9/1994 | Kraft | B60L 50/66 180/167 |
| 6,883,201 | B2 | 4/2005 | Jones et al. | |
| 8,417,383 | B2 * | 4/2013 | Ozick | G05D 1/0231 700/258 |
| 9,827,677 | B1 * | 11/2017 | Gilbertson | B25J 9/1682 |

(Continued)

OTHER PUBLICATIONS

Etherington, Darrell, "The Ohmni home robot wants to help families stay in touch with telepresence", TechCrunch, Apr. 12, 2017. 4 pages. Retrieved from the Internet <URL https://techcrunch.com/2017/04/12/the-ohmni-home-robot-wants-to-help-families-stay-in-touch-with-telepresence/>.

*Primary Examiner* — Truc M Do
(74) *Attorney, Agent, or Firm* — Lindauer Law, PLLC

(57) ABSTRACT

A robotic assistant comprises a plurality of sensors in a compact and unobtrusive form. One or more sensors may be emplaced upon a mast that may be selectively raised and lowered. The mast allows the robotic assistant to acquire images or other sensor data from a greater height, without substantially increasing the bulk of the robotic assistant. For ease of transport from one floor to another or from one building to another, the robotic assistant may deploy a handhold that a human may use to pick up and carry the robotic assistant. Floor characterization sensors may be used to determine characteristics of the floor such as if the floor is wet or dry. The robotic assistant may be used to provide a user with access to network services, to monitor a facility, provide telepresence services, and so forth.

20 Claims, 18 Drawing Sheets

(56) References Cited

U.S. PATENT DOCUMENTS

| | | | |
|---|---|---|---|
| 2005/0126144 A1* | 6/2005 | Koselka | A01D 46/30 56/10.2 R |
| 2007/0061041 A1* | 3/2007 | Zweig | G05D 1/0261 700/245 |
| 2007/0192910 A1* | 8/2007 | Vu | B25J 5/007 700/245 |
| 2008/0047375 A1* | 2/2008 | Sonoura | G05D 1/0891 74/5.22 |
| 2010/0206651 A1* | 8/2010 | Nagasaka | B25J 5/007 180/218 |
| 2011/0202175 A1* | 8/2011 | Romanov | B25J 5/00 700/250 |
| 2011/0288684 A1* | 11/2011 | Farlow | B25J 11/009 700/264 |
| 2012/0061155 A1* | 3/2012 | Berger | B25J 5/007 180/21 |
| 2015/0190925 A1* | 7/2015 | Hoffman | B25J 9/161 700/257 |
| 2016/0289988 A1* | 10/2016 | Maggeni | E04H 4/1654 |
| 2017/0008579 A1* | 1/2017 | Wiley | B62D 61/06 |

* cited by examiner

ROBOTIC ASSISTANT

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
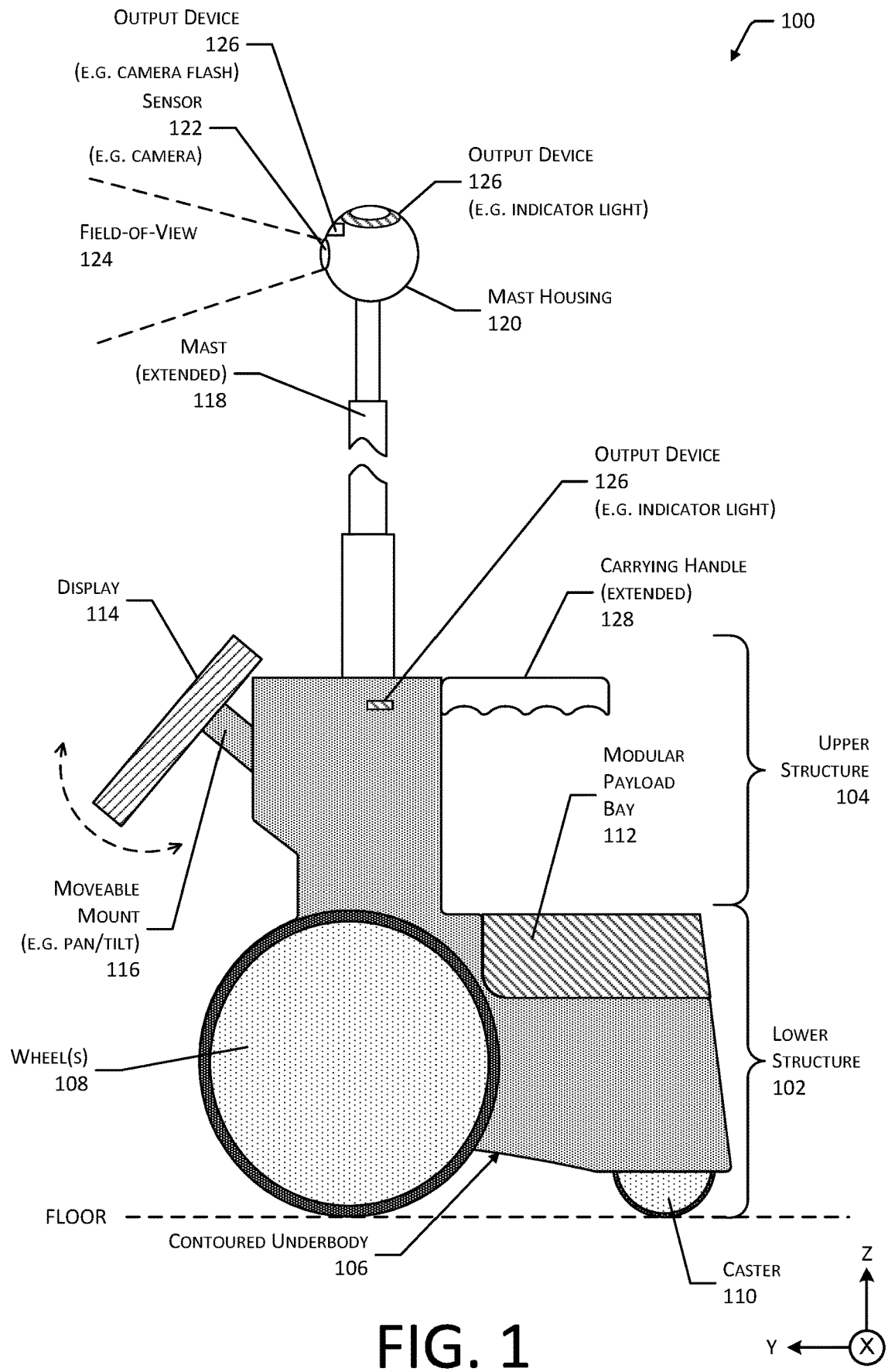
FIG. 1 illustrates a view of a robot, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Every day a user may face a wide variety of different tasks to be completed. These tasks may include monitoring what is happening in another room of the home, staying in communication with other people, performing household chores, and so forth. Some of these tasks may either be completed by a robotic assistant or assisted at least in part by the robotic assistant.

Described in this disclosure is a robotic assistant the provides a mobile platform upon which a variety of sensors and output devices may be utilized. The robotic assistant may operate autonomously, semi-autonomously, under remote control, or in various combinations thereof. The robotic assistant may perform some computational tasks on board, or may send sensor data or information based at least in part on sensor data to an external device such as a server for further processing. In one implementation, the robotic assistant may acquire audio data from a microphone and provide the audio data to a server. The server may then process the audio data and generate commands that initiate actions such as adding an item to a shopping list, controlling home automation equipment, summoning medical assistance, and so forth.

The robotic assistant (or "robot") provides a user-friendly physical form factor that enhances user safety, convenience, and facilitates the performance of a variety of different tasks. For example, the size and shape of the robot is such that it is relatively lightweight and designed to minimize injury in the event of an inadvertent contact with the person, pet, or other objects in the environment. The body of the robot may be shaped to minimize sharp corners and provide for slanted surfaces that redirect and lessen impact. Wheels and other moving parts are designed to minimize exposure to potential pinch points during operation.

In one implementation, the robot may utilize a pair of drive wheels located towards the front of the robot and a trailing caster wheel. The underside of the robot may exhibit a contoured underbody that transitions from a first height at the front of the robot down to a second height in front of the caster. The contoured underbody may facilitate movement of the robot by preventing the robot from becoming high centered over an obstruction or upon a transition from one floor to another.

A modular payload bay allows the robot to support variety of different tasks. For example, the modular payload bay may be used to carry a container basket, allowing the robot to carry objects from one place to another. In another example, the modular payload bay may provide a charging device suitable for recharging portable electronic devices such as smartphones, tablets, and so forth.

The robot incorporates a display that may be utilized to present visual information to the user. In some implementations, the display may comprise a touch screen allowing user input to be acquired as well. The display may be mounted on a movable mount that allows motions along one or more axes. For example, the movable mount may allow the display to be tilted, rotated, and so forth. Movements of the display may be used to provide a desired viewing angle to the user, to provide output from the robot, and so forth. For example, the display may be tilted forward and backward to provide a gestural output equivalent to a human nodding their head.

The robot may incorporate a mast that is either extensible and retractable, or fixed. At the top of the mast, a mast housing may contain one or more sensors, output devices, and so forth. For example, the sensors may include a camera while the output devices may include a light to provide illumination for the camera, an indicator light to indicate that the robot is providing a particular function, and so forth.

The robot may include a carrying handle to facilitate relocation from one place to another. For example, the user may utilize the carrying handle to pick up and carry the robot from one floor to another. The carrying handle may be designed to be stowed or retracted when not in use. In some implementations, the robot may be able to electronically control the deployment of the carrying handle. A safety interlock sensor may be provided that inhibits operation of one or more motors of the robot when the carrying handle is deployed.

A suite of sensors monitors the space around the robot and generate sensor data. The sensor data may be processed to allow the robot to interact appropriately with the environment, such as by avoiding inadvertent contact or navigating from one room to another. The sensors may include a floor characterization sensor that allows for the type of floor beneath the robot to be characterized. For example, the floor characterization sensor may include a device to measure the electrical resistance provided by the floor between at least two of the wheels of the robot. In one implementation, the wheels may comprise an electrically conductive material, or may include electrically conductive elements such as metallic traces. In addition to measuring the electrical resistance, electrical conductivity afforded by the wheels may be used to dissipate static electricity, reducing or eliminating electrostatic discharge (ESD) associated with the robot.

Power for operation of the robot may be provided using two or more batteries. A first battery system may provide electrical power suitable for driving motors such as the wheels, mast motors associated with raising and lowering mast, and so forth. A second battery system may provide electrical power for operation of sensors, computers, radios, and so forth. By utilizing separate batteries, issues such as power filtration, noise generation, low-voltage events, and so forth may be mitigated. For example, as the driving motors are activated there may be a momentary decrease in voltage at the first battery system. Because the other devices such as sensors and computers draw power from the second battery system, they are unaffected by the decrease in voltage of the first battery system.

Utilization of the robot may be further facilitated by utilizing a container for shipping that minimizes physical movement of the robot. For example, the robot may be shipped in a container which has a drop flap or side that opens like a drawbridge. The user may then remove some retention blocks such as foam packing material, and the robot may drive itself out of the container. As a result, the user does not need to lift the robot out.

By utilizing the hardware and techniques described in this disclosure, the robot may be used to provide a variety of different tasks. For example, the robot may be used in the role of a watchman, traveling within a house and utilizing the sensors such as the camera on the mast to look around rooms, see what is on countertops or tables, lookout windows, and so forth. In another example, the robot may be used as a companion that follows the user or comes when called, provides access to various internet-enabled functions such as presenting content available from servers, responds to queries for information, and so forth. In yet another example, the robot may be utilized as an input and output device to facilitate communication, such as videoconferencing with another party.

Illustrative System

FIG. 1 illustrates a view of a robot 100, according to some implementations. The robot 100 may comprise a lower structure 102 and an upper structure 104. In some implementations, the lower structure 102 and the upper structure 104 may comprise separate structural elements, while in other implementations they may comprise a single or integral element. The lower structure 102 contains one or more elements associated with a drive system to allow the robot 100 to move about within the environment. The underside of the lower structure 102 may provide a contoured underbody 106. The drive system may include two wheels 108 having an axle proximate to a front of the robot 100. These wheels 108 may be connected to one or more motors that are used to drive the wheels 108. Each wheel 108 may be driven independently of the other, allowing for the speed and direction of the rotation of the wheels 108 to differ from one another. For example, the robot 100 may be able to attain a straight-line top speed of at least 1.5 meters/second.

Depicted is a caster 110. In this implementation, the caster 110 is trailing in that is it located behind an axle of the wheels 108. The caster 110 may be free spinning, or have directional control afforded by one or more motors that rotate the caster 110. The concavely contoured underbody 106 transitions from a first height proximate to the front of the robot 100 to a second height near the caster 110 that is lower than the first. The contoured underbody 106 helps direct the robot 100 over obstacles, such as a transition between two different heights of flooring. Upon encountering an obstacle, the robot 100 may slide forward along the contoured underbody 106. In other implementations, the caster 110 may comprise a sphere, ball caster, and so forth.

The wheels 108 may incorporate a tread that is non-marking to flooring material and provides for a coefficient of friction sufficient to provide traction on flooring surfaces. The tread may also comprise a material into which objects on the floor will not become embedded. For example, the tread of the wheels 108 may comprise a polyurethane. The tread of the wheels 108 may be offset or otherwise randomized to reduce or eliminate runout during operation. For example, each wheel 108 may have a tread pattern in which a left half exhibits a peak while a right half exhibits a trough. In other example, other tread patterns may be used.

In some implementations, the wheels 108 may provide electrical pathway to the floor. In one implementation, the tread, wheel structure, and so forth may be doped with an electrically conductive material to provide a conductive path. The conductive path may exhibit a relatively high resistance, such as one megaohm, but in other implementations may exhibit greater or lesser resistance. In another implementation, wires, electrically conductive traces, metallic pleadings, or other electrically conductive elements may be incorporated into the wheels 108 to provide an electrically conductive path between the robot 100 and the floor.

By providing the electrically conductive path to the floor, the robot 100 may be able to dissipate accumulated electrostatic charges. Such dissipation may prevent electrostatic discharge (ESD) damage to the robot 100, or to other devices or objects that may come in contact with the robot 100.

In some implementations, electrically conductive path to the floor may be used to assist in the characterization of the floor. For example, the electrical resistance of the floor between the left wheel 108 and the right wheel 108 may be measured. The electrical resistance may differ based on the composition of the floor, whether the floor is wet, and so forth. By measuring the electrical resistance, information about the floor may thus be ascertained. This information may be used to modify operation of the robot 100, generate notifications, provide input for navigation, and so forth. For example, if the change in electrical resistance is consistent with the floor being wet, the robot 100 may reduce speed and generate a notification to the user that the floor is wet. In another example, if the electrical resistance is indicative of the floor material being wood as compared to concrete or tile, this information may be used for navigation to assist in determining which room or which portion of a room the robot 100 is currently located.

The wheels 108 may be designed for easy removal to facilitate maintenance. For example, the wheels 108 may be disengaged from the robot 100 to allow for the removal of threads or other fibers that may become entangled around the axle.

The lower structure 102 may be used to contain those components of the robot 100 that are heavier. For example, the lower structure 102 may house the motors for the wheels 108, one or more batteries, and so forth. By placing the heavier components in the lower structure 102, the height of the center of gravity (COG) of the robot 100 is kept relatively low, such as within the lower structure 102. This low height of the COG may improve stability of the robot 100 during operation.

Power for operation of the robot may be provided using two or more batteries. A first battery system may provide electrical power suitable for driving motors such as the wheels, mast motors associated with raising and lowering mast, and so forth. A second battery system may provide electrical power for operation of sensors, computers, radios, and so forth. By utilizing separate batteries, issues such as power filtration, noise generation, low-voltage events, and so forth may be mitigated. For example, as the driving motors are activated there may be a momentary decrease in voltage at the first battery system. Because the other devices such as sensors and computers draw power from the second battery system, they are unaffected by the decrease in voltage of the first battery system. One or both of these battery systems may be located within the lower structure 102.

The robot 100 may include a modular payload bay 112. In the implementation depicted here, the modular payload bay 112 is located within the lower structure 102. The modular payload bay 112 provides one or more of mechanical or electrical connectivity with robot 100. For example, modular payload bay 112 may include one or more engagement features such as slots, cams, ridges, magnets, bolts, and so forth that are used to mechanically secure an accessory within the modular payload bay 112. In one implementation, the modular payload bay 112 may comprise walls within which the accessory may sit. In another implementation, the modular payload bay 112 may include other mechanical engagement features such as slots into which the accessory may be slid and engage.

The modular payload bay 112 may include one or more electrical connections. For example, the electrical connections may comprise a universal serial bus (USB) connection that allows for the transfer of data, electrical power, and so forth between the robot 100 and the accessory.

The robot 100 incorporates a display 114 that may be utilized to present visual information to the user. In some implementations, the display 114 may be located with or affixed to the upper structure 104. In some implementations, the display 114 may comprise a touch screen that allows user input to be acquired. The display 114 may be mounted on a movable mount 116 that allows motion along one or more axes. For example, the movable mount 116 may allow the display 114 to be tilted, rotated, and so forth. The display 114 may be moved to provide a desired viewing angle to the user, to provide output from the robot 100, and so forth. For example, the output may comprise the display 114 being tilted forward and backward to provide a gestural output equivalent to a human nodding their head.

The robot 100 may incorporate a mast 118. The mast 118 provides a location from which additional sensors are output devices may be placed at a higher vantage point. The mast 118 may be fixed or extensible. The extensible mast 118 is depicted in this illustration. The extensible mast 118 may be transitioned between a retracted state, an extended state or placed at some intermediate value between the two.

At the top of the mast 118 may be a mast housing 120. In this illustration, the mast housing 120 is approximately spherical, however in other implementations other physical form factors such as cylinders, squares, or other shapes may be utilized.

The mast housing 120 may contain one or more sensors 122. For example, the sensors 122 may include a camera having a field-of-view (FOV) 124. In another example, the sensors 122 may include an optical sensor to determine a distance to an object. The optical sensor may look upward, and may provide information as to whether there is sufficient clearance above the robot 100 to deploy the mast 118. In another example, the mast housing 120 may include one or more microphones.

One or more output devices 126 may also be contained by the mast housing 120. For example, the output devices 126 may include a camera flash used to provide illumination for the camera, an indicator light that provides information indicative of a particular operation of the robot 100, and so forth.

Other output devices 126, such as one or more lights, may be elsewhere on an exterior of the robot 100. For example, a light may be arranged on a side of the upper structure 104.

In some implementations, one or more of the sensors 122, output device 126, or the mast housing 120 may be movable. For example, the motor may allow for the mast 118, the mast housing 120, or combination thereof to be rotated allowing the FOV 124 to be panned from left to right.

The mast 118 may be configured as one or more safety features. For example, a portion of the mast 118 at the base of the mast 118 may be configured to deform or break in the event that a load exceeding a threshold amount is applied to the mast 118. In another implementation, the mounting point for the mast 118 to the upper structure 104 include one or more breakaway elements, allowing the mast 118 two break away from the upper structure 104 in the event that a load exceeds the threshold amount. In yet another implementation, the mast 118 may comprise a flexible structure that bends when a load exceeding a threshold amount is applied to the mast 118.

In some implementations, the display 114 may be mounted to the mast 118. For example, the display 114 may be incorporated into the mast housing 120. In another example, the display 114 may be mounted to a portion of the mast 118, and so forth.

The robot 100 may occasionally need to be manually transported from one location to another. For example, the robot 100 may be unable to climb stairs, enter a vehicle, and so forth. To facilitate manual transportation, the robot 100 may include a carrying handle 128. The carrying handle 128 may be retractable such that, when not in use, the carrying handle 128 is not accessible. The carrying handle 128 may retract and deploy via translation, rotation, or extension. For example, the carrying handle 128 may slide out from the upper structure 104, or may rotate about a pivot point at one end. In the event the robot 100 is to be transported, the carrying handle 128 may be deployed. The carrying handle 128 may be positioned such that at least a portion of the carrying handle 128 is over the COG of the robot 100. In another implementation, the carrying handle 128 may deploy upwards from the lower structure 102.

Deployment of the carrying handle 128 may include manual operation, such as the user pressing a handle release button, or may be electronically activated by the robot 100 using an electrically operated mechanism. For example, the electronic activation may involve the robot 100 generating a command that activates an electrically operated mechanism such as one or more of a motor, solenoid, piezoelectric material, electroactive polymer, shape-memory alloy, and so forth that releases a latch and allows a spring to push the carrying handle 128 into the deployed position. Continuing the example, the user may utter a command such as "robot, deploy carrying handle". Automated speech recognition systems may be used to recognize the utterance and as a result the electrically operated mechanism is activated. In another implementation, the electrically operated mechanism may provide the force that deploys the carrying handle 128. Retraction of the carrying handle 128 may be manual or electronically activated.

By utilizing a retractable carrying handle 128 that may be stowed when not in use, safety of the robot 100 is improved. For example, the retracted carrying handle 128 is no longer exposed to be caught on some other object. Additionally, safety may be further improved by including a safety interlock associated with the carrying handle 128. The safety interlock may be based on data such as information indicative of the deployment of the carrying handle 128, or may be based at least in part on sensor data. For example, a switch may be used to indicate whether the carrying handle 128 has been stowed. While the carrying handle 128 is extended, operation of one or more motors in the robot 100 may be inhibited or otherwise prevented from being operated. For example, while the carrying handle 128 is extended, the motors used to dry the wheels 108 may be rendered inoperable such that the robot 100 may not move. In another example, while the carrying handle 128 is extended, the mast 118 may be placed into a retracted position and remain there until the carrying handle 128 has been stowed. By limiting the motion of the robot 100 while the carrying handle 128 is extended for use, the possibility for an adverse interaction between the robot 100 and the user is reduced.

The overall dimensions of the robot 100 may vary based at least in part on the application. In one implementation, the robot may be less than 19 inches tall (with the mast 118 retracted), less than 16 inches wide, and less than 14 inches deep.

Figure 2:
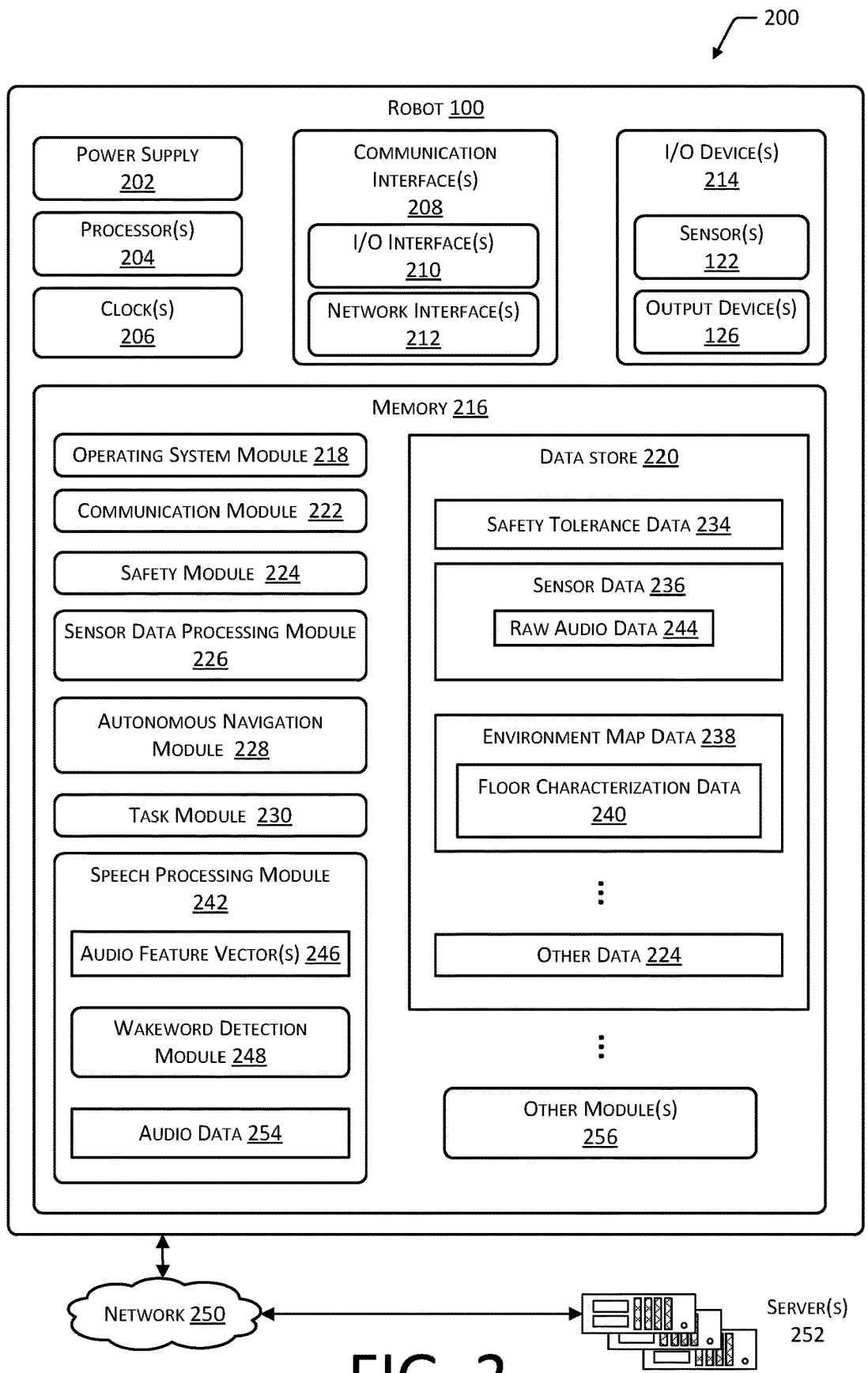
FIG. 2 is a block diagram of the robot, according to some implementations.

FIG. 2 is a block diagram 200 of the robot 100, according to some implementations.

The robot 100 may include one or more power supplies 202 to provide electrical power suitable for operating the components in the robot 100. The one or more power supplies 202 may comprise batteries, capacitors, fuel cells, photovoltaic cells, wireless power receivers, wireless power receivers, conductive couplings suitable for attachment to an external power source such as provided by an electric utility, and so forth. The robot 100 may implement multiple separate power supplies 202. For example, a first power supply may be used to provide electrical power to one or more motors of the robot 100 while a second power supply is used to provide electrical power to other electronics such as processors, communication interfaces, sensors 122, and so forth.

The robot 100 may include one or more hardware processors 204 (processors) configured to execute one or more stored instructions. The processors 204 may comprise one or more cores. The processors 204 may include microcontrollers, systems on a chip, field programmable gate arrays, digital signals processors, graphic processing units, general processing units, and so forth. One or more clocks 206 may provide information indicative of date, time, ticks, and so forth. For example, the processor 204 may use data from the clock 206 to associate a particular interaction with a particular point in time.

The robot 100 may include one or more communication interfaces 208 such as input/output (I/O) interfaces 210, network interfaces 212, and so forth. The communication interfaces 208 enable the robot 100, or components thereof, to communicate with other devices or components. The communication interfaces 208 may include one or more I/O interfaces 210. The I/O interfaces 210 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 210 may couple to one or more I/O devices 214. The I/O devices 214 may include input devices such as one or more of a sensor 122, keyboard, mouse, scanner, and so forth. The I/O devices 214 may also include output devices 126 such as one or more of a motor, light, speaker, display, projector, printer, and so forth. In some embodiments, the I/O devices 214 may be physically incorporated with the robot 100 or may be externally placed.

The network interfaces 212 may be configured to provide communications between the robot 100 and other devices such as other robots 100, a docking station, routers, access points, and so forth. The network interfaces 212 may include devices configured to couple to personal area networks (PANs), local area networks (LANs), wireless local area networks (WLANS), wide area networks (WANs), and so forth. For example, the network interfaces 212 may include devices compatible with Ethernet, Wi-Fi, Bluetooth, Bluetooth Low Energy, ZigBee, and so forth.

The robot 100 may also include one or more busses or other internal communications hardware or software that allow for the transfer of data between the various modules and components of the robot 100.

As shown in FIG. 2, the robot 100 includes one or more memories 216. The memory 216 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 216 provides storage of computer-readable instructions, data structures, program modules, and other data for the operation of the robot 100. A few example functional modules are shown stored in the memory 216, although the same functionality may alternatively be implemented in hardware, firmware, or as a system on a chip (SoC).

The memory 216 may include at least one operating system (OS) module 218. The OS module 218 is configured to manage hardware resource devices such as the I/O interfaces 210, the I/O devices 214, the communication interfaces 208, and provide various services to applications or modules executing on the processors 204. The OS module 218 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS) as promulgated at www.ros.org, and so forth.

Also stored in the memory 216 may be a data store 220 and one or more of the following modules. These modules may be executed as foreground applications, background tasks, daemons, and so forth. The data store 220 may use a flat file, database, linked list, tree, executable code, script, or other data structure to store information. In some implementations, the data store 220 or a portion of the data store 220 may be distributed across one or more other devices including other robots 100, servers, network attached storage devices, and so forth.

A communication module 222 may be configured to establish communication with other devices, such as other robots 100, an external server, a docking station, and so forth. The communications may be authenticated, encrypted, and so forth.

Other modules within the memory 216 may include a safety module 224, a sensor data processing module 226, an autonomous navigation module 228, task module 230, or other modules 256. The modules may access data stored within the data store 220, such as safety tolerance data 232, sensor data 234, environment map data 236, floor characterization data 238, or other data 242.

The safety module 224 may access safety tolerance data 232 to determine within what tolerances the robot 100 may operate safely within the environment. For example, the safety module 224 may be configured to stop the robot 100 from moving when the carrying handle 128 is extended. In another example, the safety tolerance data 232 may specify a minimum sound threshold which, when exceeded, stops all movement of the robot 100. Continuing this example, detection of sound such as a human yell wood stop the robot 100. In another example, the safety module 224 may access safety tolerance data 232 that specifies a minimum distance from an object that the robot 100 may maintain. Continuing this example, a sensor 122 detects an object that approaches at less than the minimum distance, all movement of the robot 100 may be stopped. Movement of the robot 100 may be stopped by one or more of inhibiting operation of one or more of the motors, issuing a command to stop motor operation, disconnecting power from one or more the motors, and so forth. The safety module 224 may be implemented as hardware, software, or a combination thereof.

The safety module 224 may control other factors, such as a maximum speed of the robot 100 based on information obtained by the sensors 122, precision and accuracy of the sensor data 234, and so forth. For example, detection of an object by an optical sensor may include some error, such as when the distance to an object comprises a weighted average between an object and a background. As a result, the maximum speed permitted by the safety module 224 may be based on one or more factors such as the weight of the robot 100, nature of the floor, distance to object, and so forth.

The sensor data processing module 226 may access sensor data 234 that is acquired from one or more the sensors 122. The sensor data processing module 226 may provide various processing functions such as de-noising, filtering, change detection, and so forth. Processing of sensor data 234, such as images from a camera sensor 122, may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 236. In still another implementation, functions such as those in the Machine Vision Toolbox for Matlab (MVTB) available using MATLAB as developed by Math Works, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 234 or other data 242. For example, the ANN may be a trained using a supervised learning algorithm such that object identifiers are associated with images of particular objects within training images provided to the ANN. Once trained, the ANN may be provided with the sensor data 236 and produce output indicative of the object identifier.

The autonomous navigation module 228 provides the robot 100 with the ability to navigate within the environment without real-time human interaction. For example, the atomic navigation module 228 may implement one or more simultaneous localization and mapping ("SLAM") techniques to determine the presence of obstacles, walls, landmarks, and so forth. The SLAM algorithms may utilize one or more of maps, algorithms, beacons, or other techniques to provide navigational data. The navigational data may then be used to determine a path which is then subsequently used to determine a set of commands that drive the motors connected to the wheels 108. For example, the autonomous navigation module 228 may access environment map data 236 during operation to determine relative location, estimate a path to a destination, and so forth.

The autonomous navigation module 228 may utilize various techniques during processing of sensor data 234. For example, image data obtained from cameras may be processed to determine one or more of corners, edges, planes, and so forth. In some implementations corners may be detected and the coordinates of those corners may be used to produce point cloud data.

The environment map data 236 may be manually or automatically determined. Continuing the example, during the learning phase, or subsequent operation, the robot 100 may generate environment map data 236 that is indicative of locations of objects and structures such as chairs, doors, and so forth.

In some implementations, the environment map data 236 may include floor characterization data 238. The floor characterization data 238 is indicative of one or more attributes of the floor at a particular location within the environment. The floor characterization data 238 is discussed in more detail below with regard to FIG. 16.

The autonomous navigation module 228 may be used to move the robot 100 from a first location to a second location within the environment. This movement may be responsive to determination made by an onboard processor 204, in response to a command received via one or more communication interfaces 208 or a sensor 122, and so forth. For example, an external server may send a command that is subsequently received using a network interface 212. This command may direct the robot 100 to proceed to a designated destination, such as "living room" or "dining room". The robot 100 may then process this command, and use the autonomous navigation module 228 to determine the directions and distances associated with reaching the specified destination.

The memory 216 may store one or more task module 230. A task module 230 comprises instructions that, when executed, provide one or more functions associated with a particular task. In one example, the task may comprise a security or watchmen task in which the robot 100 travels throughout the environment looking for events that exceed predetermined thresholds. Continuing the example, if the robot 100 detects that the ambient temperature is below a minimum level, or that water is present on the floor, or detects sound of broken glass, an alert may be generated. The alert may be given as an audible, visual, or electronic notification. For example, the electronic notification may involve the robot 100 transmitting data using one or more the communication interfaces 208.

In another example, the task may comprise a "follow me" feature in which the robot 100 follows a user. For example, the user may participate in a video call using the robot 100. The camera 122 on the mast 118 may be used to acquire video for transmission while the display 114 is used to present video that is received. The robot 100 may use data from one or more sensors 122 to determine a location of the user relative to the robot 100, and track and follow the user. In one implementation, computer vision techniques may be used to locate the user within image data acquired by the cameras 122. In another implementation, the user's voice may be detected by an array of microphones, and a direction to the voice with respect to the robot 100 may be established. Other techniques may be utilized either alone or in combination to allow the robot 100 to track a user, follow a user, or track and follow a user.

In yet another example, the task may allow for the robot 100 to be summoned to a particular location. The user may utter a voice command that is heard by a microphone on the robot 100, a microphone in a smart phone, or another device with a microphone such as a network enabled speaker or television. Alternatively, the user may issue a command using an app on a smartphone, wearable device, tablet, or other computing device. Given that the location of the device at which the command was obtained is known, the robot 100 may be dispatched to that location. Alternatively, if the location is unknown, the robot 100 may search for the user.

A speech processing module 240 may be used to process utterances of the user. Microphones may acquire audio in the presence of the robot 100 and may send raw audio data 244 to an acoustic front end (AFE). The AFE may transform the raw audio data 244 (for example, a single-channel, 16-bit audio stream sampled at 16 kHz), captured by the microphone, into audio feature vectors 246 that may ultimately be used for processing by various components, such as a wakeword detection module 248, speech recognition engine, or other components. The AFE may reduce noise in the raw audio data 244. The AFE may also perform acoustic echo cancellation (AEC) or other operations to account for output audio data that may be sent to a speaker of the robot 100 for output. For example, the robot 100 may be playing music or other audio that is being received from a network 250 in the form of output audio data. To avoid the output audio interfering with the device's ability to detect and process input audio, the AFE or other component may perform echo cancellation to remove the output audio data from the input raw audio data 244, or other operations.

The AFE may divide the audio data into frames representing time intervals for which the AFE determines a number of values (i.e., features) representing qualities of the raw audio data 244, along with a set of those values (i.e., a feature vector or audio feature vector) representing features/qualities of the raw audio data 244 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 244, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 246 (or the raw audio data 244) may be input into a wakeword detection module 248 that is configured to detect keywords in the audio data 254. The wakeword detection module 248 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the robot 100 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the robot 100 (or separately from speech detection), the robot 100 may use the wakeword detection module 248 to perform wakeword detection to determine when a user intends to speak a command to the robot 100. This process may also be referred to as keyword detection, with the wakeword being a specific example of a keyword. Specifically, keyword detection is typically performed without performing linguistic analysis, textual analysis, or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 248 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local robot 100 may "wake" and begin transmitting audio data 254 (which may include one or more audio feature vectors 246 or the raw audio data 244) to one or more server(s) 252 for speech processing. The audio data 254 corresponding to audio obtained by the microphone may be sent to a server 252 for routing to a recipient device or may be sent to the server 252 for speech processing for interpretation of the included speech (either for purposes of enabling voice-communications and/or for purposes of executing a command in the speech). The audio data 254 may include data corresponding to the wakeword, or the portion of the audio data 254 corresponding to the wakeword may be removed by the local robot 100 prior to sending.

The robot 100 may connect to the network 250 using one or more of the network interfaces 212. One or more servers 252 may provide various functions, such as ASR, natural language understanding (NLU), providing content such as audio or video to the robot 100, and so forth.

The other modules 256 may provide other functionality, such as object recognition, speech recognition, speech synthesis, and so forth. For example, an ASR module may accept as input raw audio data 244 or audio feature vectors 246 and may produce as output a text string that is further processed and used to provide input, initiate operation of a task module 230, and so forth. In one implementation, the text string may be sent to the server 252 for further processing. The robot 100 may receive a response from the server 252 and present output, perform an action, and so forth. For example, the raw audio data 244 may include the user saying "robot go to the dining room". The audio data 254 representative of this utterance may be sent to the server 252 that return commands directing the robot 100 to the dining room of the home associated with the robot 100.

The utterance may result in a response from the server 252 that directs operation of other devices or services. For example, the user may say "robot wake me at seven tomorrow morning". The audio data 254 may be sent to the server 252 that determines the intent and generates commands to instruct a device attached to the network 250 to play an alarm at 7:00 am the next day.

In another example, the other modules 256 may comprise a speech synthesis module that is able to convert text data to human speech.

Figure 3:
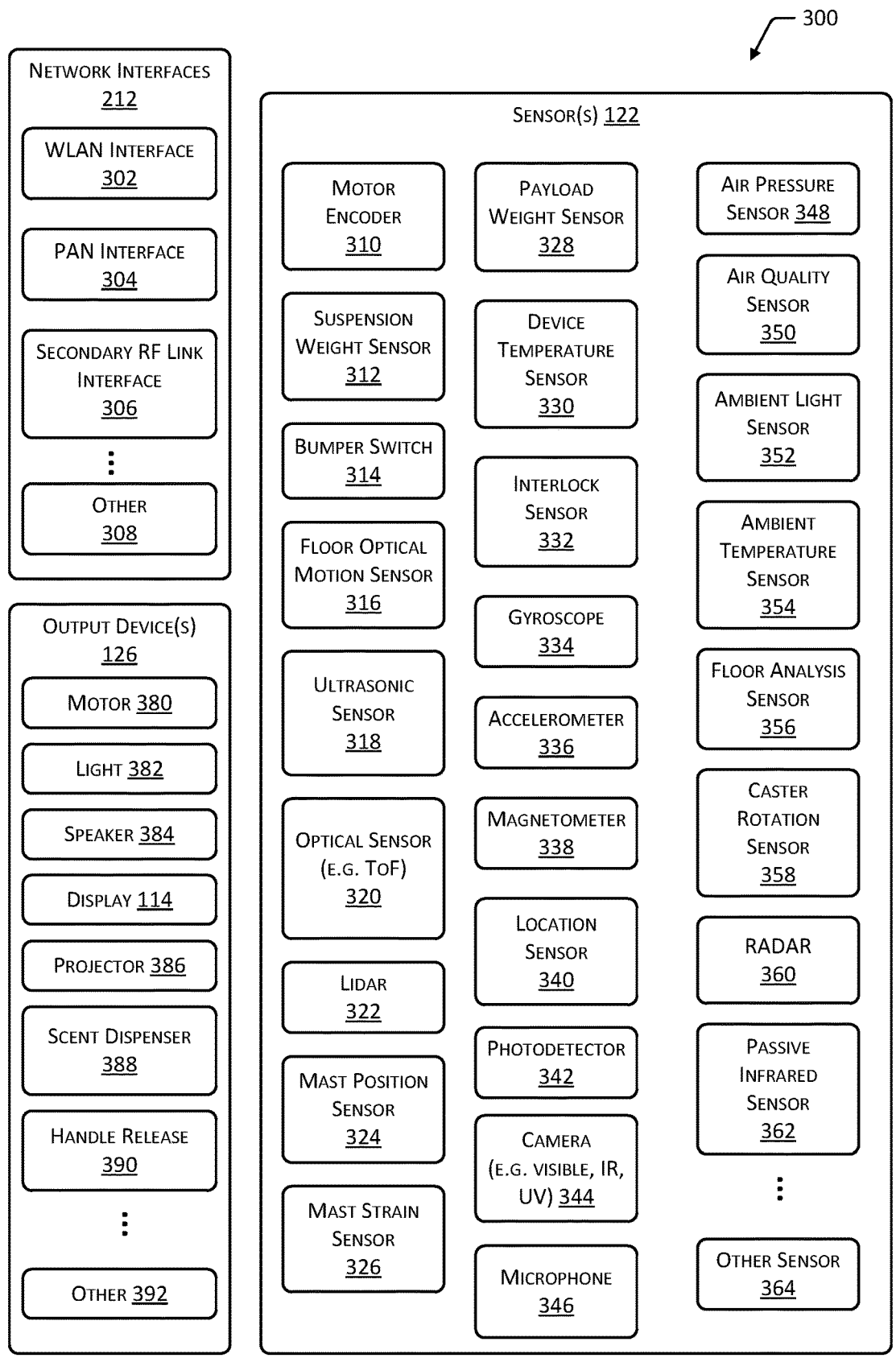
FIG. 3 is a block diagram of some components of the robot such as network interfaces, sensors, and output devices, according to some implementations.

FIG. 3 is a block diagram 300 of some components of the robot 100 such as network interfaces 212, sensors 122, and output devices 126, according to some implementations. The components illustrated here are provided by way of illustration and not necessarily as a limitation. For example, the robot 100 may utilize a subset of the particular network interfaces 212, output devices 126, or sensors 122 depicted here, or may utilize components not pictured.

The network interfaces 212 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with the least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link 306 may comprise a radio transmitter that operates in the 900 MHz ISM band, within a licensed band at another frequency, and so forth. The secondary RF link interface 306 may be utilized to provide backup communication between the robot 100 and other devices in the event that communication fails using one or more of the WLAN interface 302 or the PAN interface 304. For example, in the event the robot 100 travels to an area within the environment that does not have Wi-Fi coverage, the robot 100 may use the secondary RF link interface 306 to communicate with another device such as a specialized access point, docking station, or other robot 100.

The network interfaces 212 may include other equipment to send or receive data using other wavelengths or phenomena. For example, the network interfaces 212 may include an ultrasonic transceiver used to send data as ultrasonic sounds, a visible light system that communicates via by modulating a visible light source such as a light-emitting diode, and so forth. In another example, the network interfaces 212 may comprise a wireless wide area network (WWAN) interface or a wireless cellular data network interface. Continuing the example, the network interfaces 212 may be compliant with at least a portion of the 3G, 4G, LTE, or other standards.

The robot 100 may include one or more of the following sensors 122. The sensors 122 depicted here are provided by way of illustration and not necessarily as a limitation. It is understood other sensors 122 may be included or utilized by the robot 100, while some sensors 122 may be omitted in some configurations.

A motor encoder 310 provides information indicative of the rotation or linear extension of a motor. The motor may comprise a rotary motor, or a linear actuator. In some implementations, the motor encoder 310 may comprise a separate assembly such as a photodiode and encoder wheel that is affixed to the motor. In other implementations, the motor encoder 310 may comprise circuitry configured to drive the motor. For example, the autonomous navigation module 228 may utilize the data from the motor encoder 310 to estimate a distance traveled.

A suspension weight sensor 312 provides information indicative of the weight of the robot 100 on the suspension system for one or more of the wheels 108 or the caster 110. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel 108. In other implementations, the suspension weight sensor 312 may provide an indication such as so many kilograms of force or newtons of force. The suspension weight sensor 312 may be affixed to one or more of the wheels 108 or the caster 110. In some situations, the safety module 224 may use data from the suspension weight sensor 312 to determine whether or not to inhibit operation of one or more of the motors. For example, if the suspension weight sensor 312 indicates no weight on the suspension, the implication is that the robot 100 is no longer resting on its wheels 108, and thus operation of the motors may be inhibited. In another example, if the suspension weight sensor 312 indicates weight that exceeds a threshold value, the implication is that something heavy is resting on the robot 100 and thus operation of the motors may be inhibited.

One or more bumper switches 314 provide an indication of physical contact between a bumper or other member that is in mechanical contact with the bumper switch 314. The safety module 224 utilize sensor data 234 obtained by the bumper switches 314 to modify the operation of the robot 100. For example, if the bumper switch 314 associated with a front of the robot 100 is triggered, the safety module 224 may drive the robot 100 backwards.

A floor optical motion sensor (FOMS) 316 provides indication indicative of motions of the robot 100 relative to the floor or other surface underneath the robot 100. In one implementation, the FOMS 316 may comprise a light source such as light-emitting diode (LED), an array of photodiodes, and so forth. In some implementations, the FOMS 316 may utilize an optoelectronic sensor, such as a low resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data 238.

An ultrasonic sensor 318 utilize sounds in excess of 20 KHz to determine a distance from the sensor to an object. The ultrasonic sensor 318 may comprise an emitter such as a piezoelectric transducer and a detector such as an ultrasonic microphone. The emitter may generate specifically timed pulses ultrasonic sound while the detector listens for an echo of that sound being reflected from an object within the field of view 124. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or portion thereof may be used to provide other functionality. For example, the emitter of the ultrasonic sensor 318 may be used to transmit data and the detector may be used to receive data transmitted is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 234 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) 124 that is directed in a different way. For example, the optical sensor 320 may have four light sensing elements, each associated with a different 10° FOV 124, allowing the sensor to have an overall FOV 124 of 40°.

In another implementation, a structured light pattern may be provided by the optical emitter. A portion of the structured light pattern may then be detected on the object using a sensor 122 such as an image sensor or camera. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, safety module 224 and the autonomous navigation module 228 may utilize the sensor data 234 indicative of the distance to an object in order to prevent a collision with that object.

Multiple optical sensors 320 may be operated such that their FOV 124 overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight a distance to that particular point, sensor data 232 may be generated that is indicative of the presence of objects and the relative positions, shapes, and so forth is visible to the lidar 322. Data from the lidar 322 may be used by various modules. For example, the autonomous navigation module 228 may utilize point cloud data generated by the lidar 322 for localization of the robot 100 within the environment.

A mast position sensor 324 provides information indicative of a position of the mast 118. For example, the mast position sensor 324 may comprise limit switches associated with the mast extension mechanism that indicate whether the mast 118 is an extended or retracted position. In other implementations, the mast position sensor 324 may comprise an optical code on at least a portion of the mast 118 that is then interrogated by an optical emitter and a photodetector to determine the distance which the mast 118 is extended. In another implementation, the mast position sensor 324 may comprise an encoder wheel that is attached to a mast motor that is used to raise or lower the mast 118. The mast position sensor 324 may provide data to the safety module 224. For example, if the robot 100 is preparing to deploy the carrying handle 128, data from the mast position sensor 324 may be checked to determine if the mast 118 is retracted, and if not, the mast 118 may be retracted prior to deployment of the carrying handle 128. By retracting the mast 118 before the carrying handle 128 is deployed, injury to the user as well as damage to the mast 118 is avoided as the user bends down to grasp the carrying handle 128.

A mast strain sensor 326 provides information indicative of a strain on the mast 118 with respect to the remainder of the robot 100. For example, the mast strain sensor 326 may comprise strain gauge or load cell that measures a sideload as applied to the mast 118 or a weight on the mast 118 or downward pressure on the mast 118. The safety module 224 may utilize sensor data 236 obtained by the mast strain sensor 326. For example, if the strain applied to the mast 118 exceeds a threshold amount, the safety module 224 may direct an audible and visible alarm to be presented by the robot 100.

A payload weight sensor 328 provides information indicative of the weight associated with the modular payload bay 112. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 224 may utilize the payload weight sensor 328 to determine if the modular payload bay 112 has been overloaded. If so, an alert or notification may be issued.

One or more device temperature sensors 330 may be utilized by the robot 100. The device temperature sensors 330 provide temperature data of one or more components within the robot 100. For example, a device temperature sensor 330 may indicate a temperature of one or more the batteries, one or more motors, and so forth. In the event the temperature exceeds a threshold value, the component associated with that device temperature sensor 330 may be shut down.

One or more interlock sensors 332 may provide data to the safety module 224 or other circuitry that prevents the robot 100 from operating in an unsafe condition. For example, the interlock sensors 332 may comprise switches that indicate whether an access panel is open, if the carrying handle 128 is deployed, and so forth. The interlock sensors 332 may be configured to inhibit operation of the robot 100 until the interlock switch indicates a safe condition is present.

A gyroscope 334 may provide information indicative of rotation of an object affixed thereto. For example, gyroscope 334 may generate sensor data 234 that is indicative of a change in orientation of the robot 100 or portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or another device. For example, the gyroscope 334 in the accelerometer 336 may comprise a prepackaged solid-state inertial measurement unit (IMU) that provides for multiple access gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The robot 100 may include one or more locations sensors 340. The location sensors may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provide sensor data 234 indicative of impinging light. For example, the photodetector 342 may provide data indicative of a color, intensity, duration, and so forth.

A camera 344 generates sensor data 234 indicative of one or more images. A camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The robot 100 may use image data acquired by the camera 344 for object recognition, navigation, collision avoidance, user communication, and so forth. For example, a pair of cameras 344 sensitive to infrared light may be mounted on the front of the robot 100 to provide binocular stereo vision, with the sensor data 234 comprising images being sent to the autonomous navigation module 228. In another example, the camera 344 may comprise a 10 megapixel or greater camera 344 that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 228 may be acquired using a rolling shutter and subsequently may be processed to mitigate image artifacts.

One or more microphones 346 may be configured to acquire information indicative of sound present in the environment. In some implementations, arrays of microphones 346 may be used. These arrays may implement beamforming techniques to provide for directionality of gain. The robot 100 may use the one or more microphones 346 to acquire information from acoustic tags, accept voice input from users, determine ambient noise level, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include hygrometer that provides information indicative of relative humidity.

In ambient light sensor 352 may comprise one or more photodetector's or other light-sensitive elements that are used to determine one or more of the color, intensity, duration of ambient lighting around the robot 100.

In ambient temperature sensor 354 provides information indicative of the temperature of the ambient environment proximate to the robot 100. In some implementations, an infrared temperature sensor may be utilized to determine the temperature of another object at a distance.

A floor analysis sensor 356 may include one or more components that are used to generate at least a portion of the floor characterization data 238. In one implementation, floor analysis sensor 356 may comprise circuitry that may be used to determine one or more of the electrical resistance, electrical inductance, or electrical capacitance of the floor. For example, two or more of the wheels 108 in contact with the floor may include an allegedly conductive pathway between the circuitry and the floor. By using two or more of these wheels 108, the circuitry may measure one or more of the electrical properties of the floor. Information obtained by the floor analysis sensor 356 may be used by one or more of the safety module 224, the autonomous navigation module 228, the task module 230, and so forth. For example, if the floor analysis sensor 356 determines that the floor is wet, the safety module 224 may decrease the speed of the robot 100 and generate a notification alerting the user.

The floor analysis sensor 356 may include other components as well. For example, coefficient of friction sensor may comprise a probe that comes into contact with the surface and determines the coefficient of friction between the probe had and the floor.

A caster rotation sensor 358 provides data indicative of one or more of a direction of orientation, angular velocity, linear speed of the caster 110, and so forth. For example, the caster rotation sensor 358 may comprise an optical encoder and corresponding target that is able to determine that the caster 110 transitioned from an angle of 0° at a first time to 49° at a second time.

The sensors 122 may include a radar 360. The radar 360 may be used to provide information as to a distance, lateral position, and so forth, to an object.

The sensors 122 may include a passive infrared (PIR) sensor 362. The PIR 362 may be used to detect the presence of people, pets, hotspots, and so forth. For example, the PIR 362 may be configured to detect infrared radiation with wavelengths between 8 and 14 micrometers.

The robot 100 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the environment to provide landmarks for the autonomous navigation module 228. One or more touch sensors may be utilized to determine contact with a user or other object.

The robot 100 may include one or more output devices 126. A motor 366 may be used to provide linear or rotary motion. A light 368 may be used to emit photons. A speaker 370 may be used to emit sound. A display 114 may comprise one or more of a liquid crystal display, light emitting diode display, electrophoretic display, cholesterol display, interferometric display, and so forth. The display 114 may be used to present visible information such as graphics, pictures, text, and so forth. In some implementations, the display 114 may comprise a touchscreen that combines a touch sensor and a display 114.

In some implementations, the robot 100 may be equipped with a projector 372. The projector 372 may be able to project an image on the surface, such as the floor, wall, ceiling, and so forth.

A scent dispenser 374 be used to emit one or more smells. For example, the scent dispenser 374 may comprise a plurality of different scented liquids that may be evaporated or vaporized in a controlled fashion to release predetermined amounts of each.

A handle release 376 may comprise an electrically operated mechanism such as one or more of a motor, solenoid, piezoelectric material, electroactive polymer, shape-memory alloy. In one implementation, the handle release 376 may release a latch and allow a spring to push the carrying handle 128 into the deployed position. In another implementation, the electrically operated mechanism may provide the force that deploys the carrying handle 128. Retraction of the carrying handle 128 may be manual or electronically activated.

In other implementations, other 378 output devices may be utilized. For example, the robot 100 may include a haptic output device that provides output that produces particular touch sensations to the user. Continuing the example, a motor 366 with an eccentric weight may be used to create a buzz or vibration to allow the robot 100 to simulate the purr of a cat.

Figure 4:
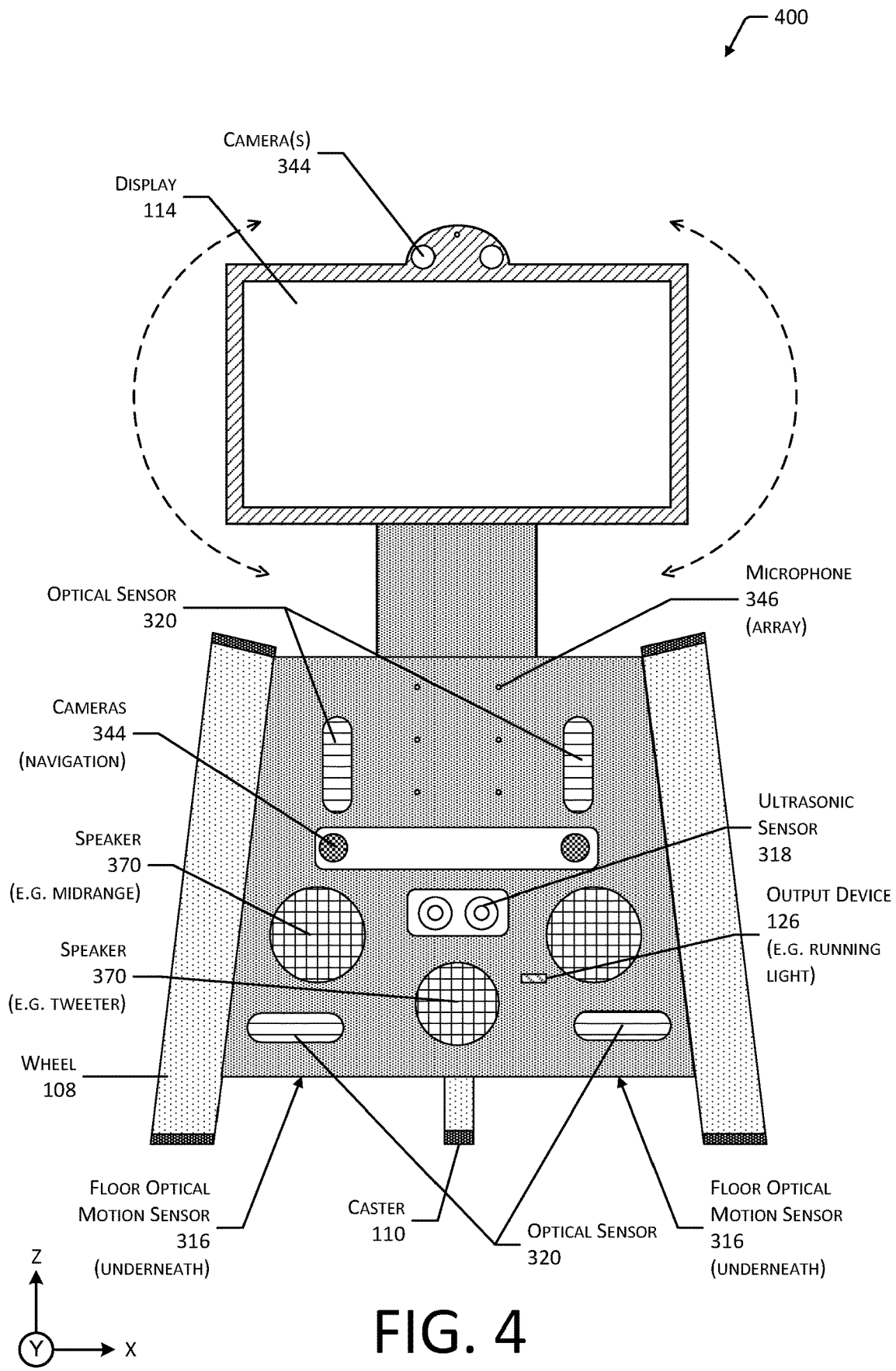
FIG. 4 is a front view of the robot, according to some implementations.

FIG. 4 is a front view 400 of the robot 100, according to some implementations. In this view, the wheels 108 are depicted on the left and right sides of the lower structure 102. As illustrated here, the wheels 108 are canted inwards towards the upper structure 104. In other implementations, the wheels 108 may be mounted vertically. The caster 110 is visible along the midline. The front section of the robot 100 includes a variety of sensors 122. A first pair of optical sensors 320 are located along the lower edge of the front while a second pair of optical sensors 320 are located along an upper portion of the front. Between the second set of the optical sensors 320 is a microphone 346 array.

In some implementations, one or more microphones 346 may be arranged within or proximate to the display 114. For example, a microphone 346 array may be arranged within the bezel of the display 114.

A pair of cameras 344 separated by a distance are mounted to the front of the robot 100 and provide for stereo vision. The distance or "baseline" between the pair of cameras 344 may be between 5 and 15 centimeters (cm). For example, the pair of cameras 344 may have a baseline of 10 cm. In some implementations, these cameras 344 may exhibit a relatively wide horizontal field-of-view (HFOV). For example, the HFOV may be between 90 and 110. A relatively wide FOV allows for easier detection of moving objects, such as users or pets that may be in the path of the robot 100. Also, the relatively wide FOV facilitates the robot 100 being able to detect objects when turning.

The sensor data 234 comprising images produced by this pair of cameras 344 be used by the autonomous navigation module 228 navigation of the robot 100. The cameras 344 used for navigation may be of different resolution from, or sensitive to different wavelengths than cameras 344 used for other purposes such as video communication. For example, the navigation cameras 344 may be sensitive to infrared light allowing the robot 100 to operate in darkness, while the camera 344 mounted above the display 114 is sensitive to visible light and is used to generate images suitable for viewing by a person. Continuing the example, the navigation cameras 344 may have a resolution of at least 300 kilopixels each while the camera 344 mounted above the display 144 may have a resolution of at least 10 megapixels. In other implementations, navigation may utilize a single camera 344.

In this illustration, the display 114 is depicted with cameras 344 arranged above the display 114. The cameras 344 may operate to provide stereoimages of the environment, the user, and so forth. For example, an image from each of the cameras 344 above the display 114 may be accessed and used to generate stereoimage data about a face of a user. This stereoimage data may then be used for facial recognition, user identification, gesture recognition, gaze tracking, and so forth. In other implementations, a single camera 344 may be present above the display 114.

As described earlier, the display 114 may be mounted on a movable mount 116. The movable mount 116 may allow the display to move along one or more degrees of freedom. For example, the display 114 may tilt as indicated above in FIG. 1, rotate as depicted here, and so forth. The size the display 114 may vary. In one implementation, the display 114 may be approximately 8 inches as measured diagonally from one corner to another.

An ultrasonic sensor 318 also mounted on the front of the robot 100 and may be used to provide sensor data 234 that is indicative of objects in front of the robot 100.

One or more speakers 370 may be mounted on the robot 100. For example, pyramid range speakers 370 are mounted on the front of the robot 100 as well as a high range speaker 370 such as a tweeter. The speakers 370 may be used to provide audible output such as alerts, music, human speech such as during a communication session with another user, and so forth.

One or more bumper switches 314 (not shown) may be present along the front of the robot 100. For example, a portion of the housing of the robot 100 that is at the leading edge may be mechanically couple to one or more bumper switches 314.

Other output devices 126, such as one or more lights 368, may be on an exterior of the robot 100. For example, a running light 368 may be arranged on a front of the robot 100. The running light 368 may provide light for operation of one or more of the cameras 344, a visible indicator to the user that the robot 100 is in operation, and so forth.

One or more of the FOMS 316 are located on an underside of the robot 100.

Figure 5:
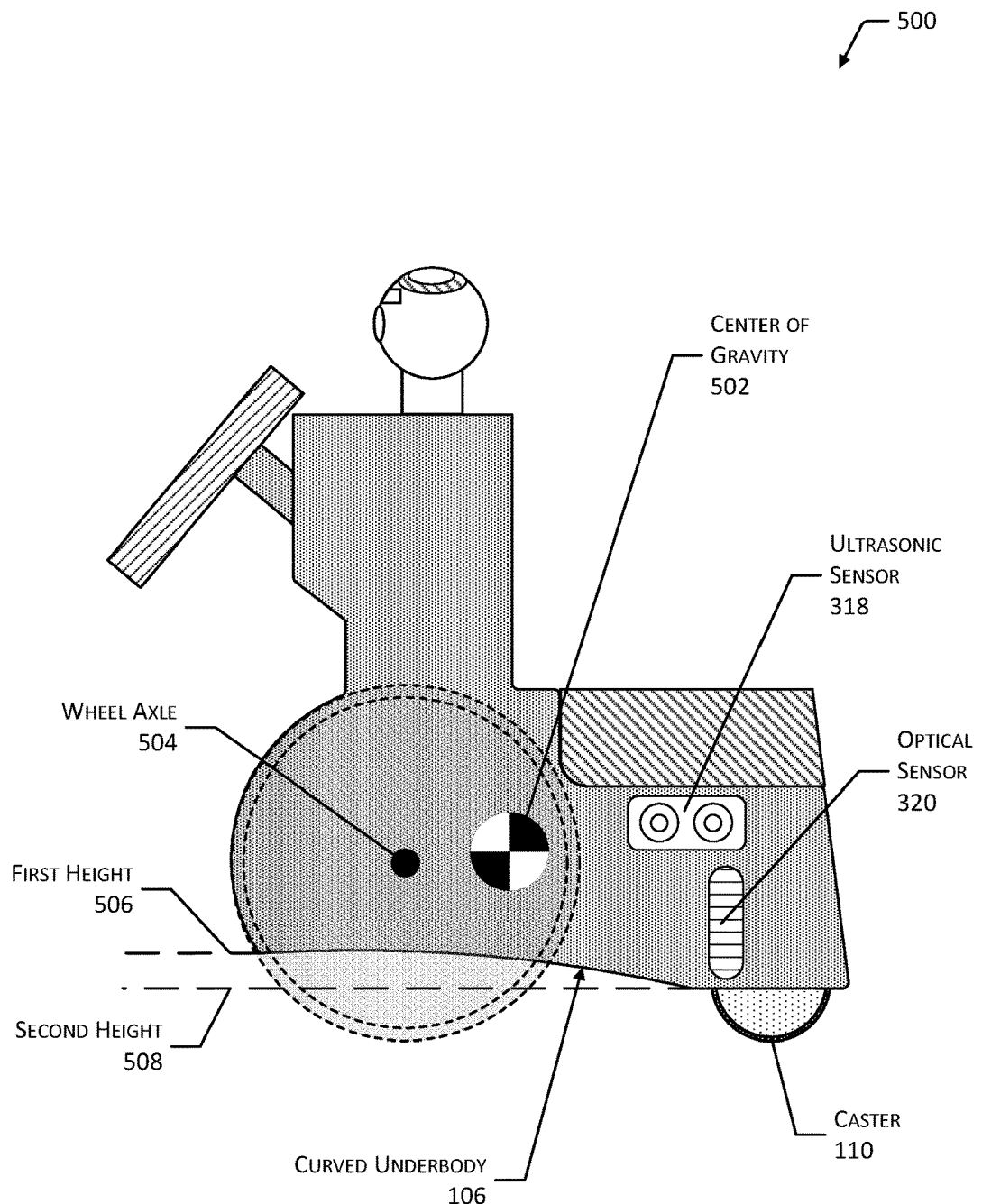
FIG. 5 is a side view of the robot, according to some implementations.

FIG. 5 is a side view 500 of the robot 100, according to some implementations.

The exterior surfaces of the robot 100 may be designed to minimize injury in the event of an unintended contact between the robot 100 and a user or a pet. For example, the various services may be angled, rounded, or otherwise designed to divert or deflect an impact. In some implementations, the housing of the robot 100, or a surface coating may comprise an elastomeric material or a pneumatic element. For example, the outer surface of the housing of the robot 100 may be coated with a viscoelastic foam. In another example, the outer surface of the housing the robot 100 may comprise a shape-memory polymer that upon impact forms but then over time returns to the original shape.

In this side view, the left side of the robot 100 is depicted. An ultrasonic sensor 318 and an optical sensor 320 are present on either side of the robot 100.

As described above, the placement of the heavier components of the robot 100 may be arranged such that a center of gravity (COG) 502 is located between a wheel axle 504 of the front wheels 108 and the caster 110. Such placement of the COG 502 may result in improved stability of the robot 100 and may also facilitate lifting by the carrying handle 128.

In this illustration, the caster 110 is shown in a trailing configuration, in which the caster 110 is located behind or aft of the wheel axle 504 and the center of gravity 502. In another implementation (not shown) the caster 110 may be in front of the axle of the wheels 108. For example, the caster 110 may be a leading caster 110 positioned forward of the center of gravity 502.

The robot 100 may encounter a variety of different floor surfaces and transitions between different floor surfaces during the course of operation. The contoured underbody 106 described above transitions from a first height 506 at the front of the robot to a second height 508 that is proximate to the caster 110. As described above, this curvature provides a ramp effect such that if the robot 100 encounters an obstacle that is below the first height 506, the contoured underbody 106 helps direct the robot 100 over the obstacle without lifting the driving wheels 108 clear from the floor. As a result, the robot 100 is better able to drive over small obstacles.

Figure 6:
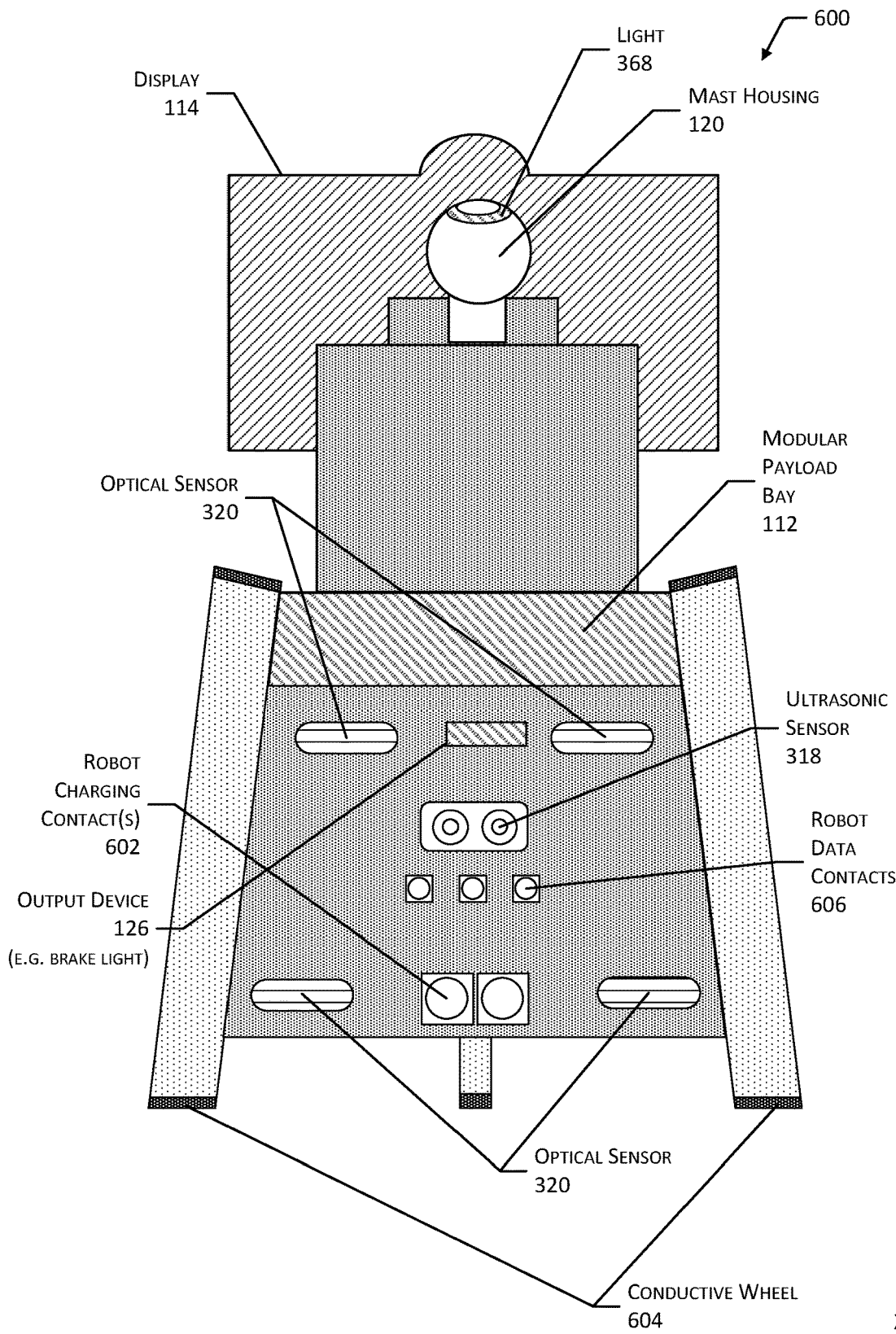
FIG. 6 is a back view of the robot, according to some implementations.

FIG. 6 is a back view 600 of the robot 100, according to some implementations. In this view, as with the front, a first pair of optical sensors 320 are located along the lower edge of the rear of the robot 100, while a second pair of optical sensors 320 are located along an upper portion of the rear of the robot 100. An ultrasonic sensor 318 provides proximity detection for objects that are behind the robot 100.

Robot charging contacts 602 may be provided on the rear of the robot 100. The charging contacts 602 may comprise electrically conductive components that may be used to provide power from an external source such as a docking station to the robot 100. In other implementations, wireless charging may be utilized. For example, wireless inductive or wireless capacitive charging techniques may be used to provide electrical power to the robot 100.

As mentioned above, in some implementations the wheels 108 may be electrically conductive wheels 604, that provide an electrical conductive pathway between the robot 100 and the floor.

One or more robot data contacts 606 may be arranged along the back of the robot 100. The robot data contacts 606 may be configured to establish contact with corresponding base data contacts within the docking station. The robot data contacts 606 may provide optical, electrical, or other connections suitable for the transfer of data.

Other output devices 126, such as one or more lights 368, may be on an exterior of the back of the robot 100. For example, a brake light may be arranged on the back surface of the robot 100 to provide users an indication that the robot 100 is stopping.

Figure 7:
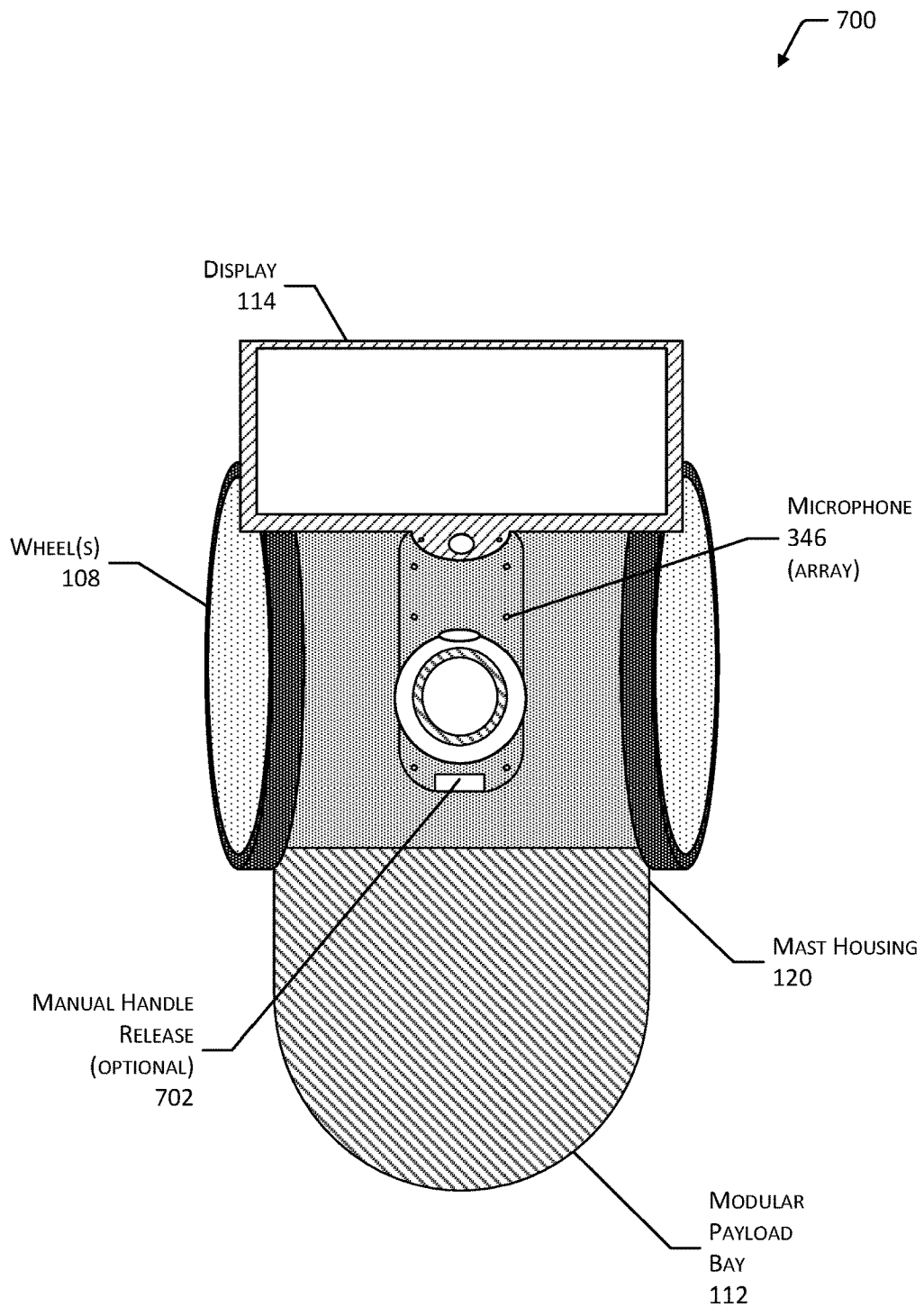
FIG. 7 is a top view of the robot, according to some implementations.

FIG. 7 is a top view 700 of the robot 100, according to some implementations. In some implementations, a microphone 346 array may be emplaced along an upper surface of the upper structure 104. For example, the microphone 346 array is shown here comprising 8 microphones 346, two of which are concealed by the mast housing 120.

In some implementations, manual handle release 702 may be optionally provided. For example, the manual handle release 702 when actuated may result in the carrying handle 128 being extended.

Figure 8:
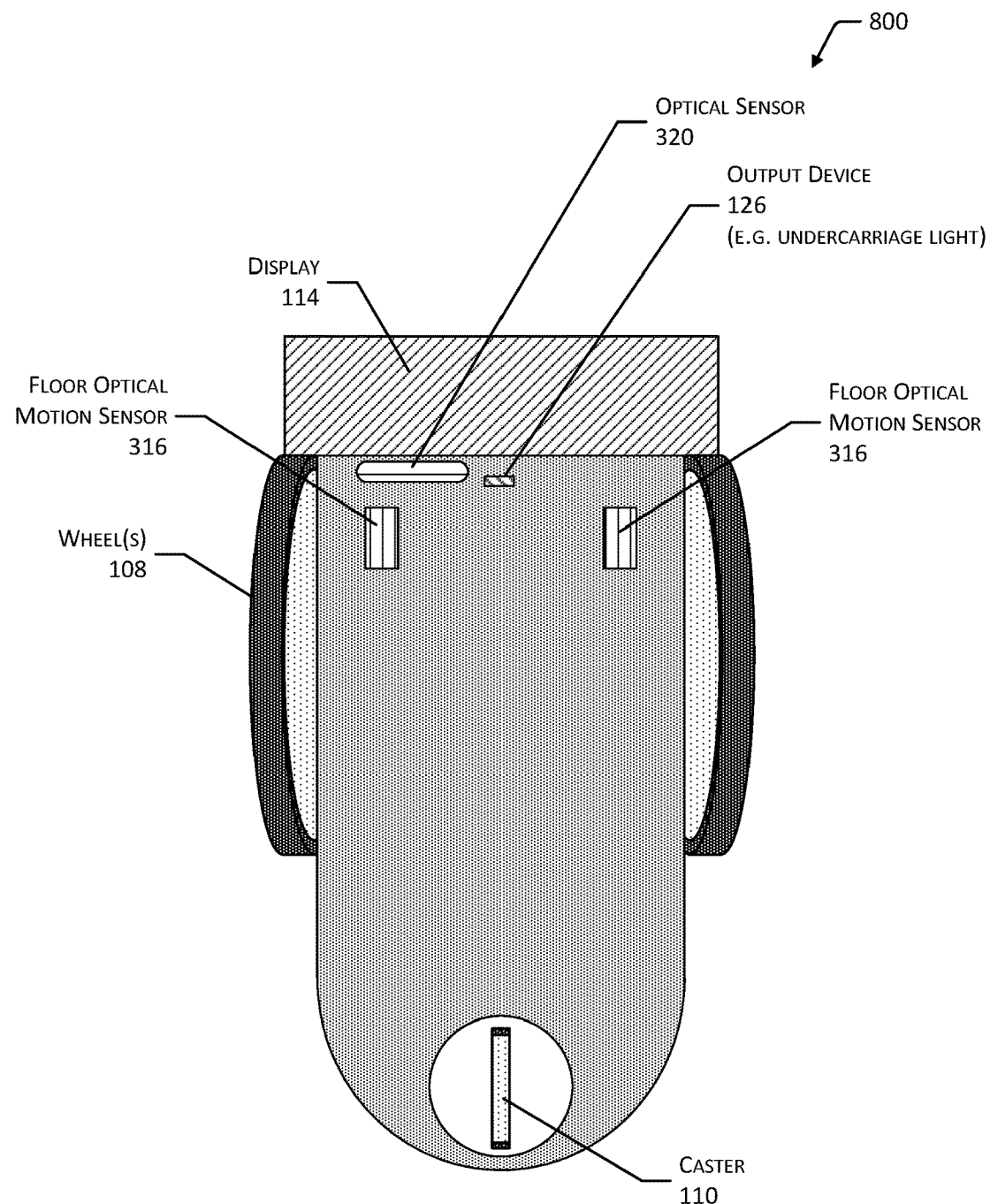
FIG. 8 is a bottom or underside view of the robot, according to some implementations.

FIG. 8 is a bottom 800 or underside view of the robot 100, according to some implementations. In this illustration, a pair of FOMS 316 are visible arranged on the underside of the robot 100 proximate to the front and on the left and right sides, proximate to the wheels 108. In another implementation, one or more FOMS 316 may be arranged along a centerline of the robot 100 running front and back.

One or more optical sensors 320 may be mounted on the underside proximate to one or more of the front edge or back edge of the robot 100. These optical sensors 320 may be used to detect the presence of a falling edge, such as a stair. For example, the optical sensors 320 mounted on the front or rear of the robot 100 may have a field of view 124 that results in a blind spot close to the robot 100. In the event that the user picks up and moves the robot 100, the robot 100 could be placed into a situation where it is unable to move safely without toppling from a falling edge. As a result, optical sensors 320 may be mounted at or near the underside of the robot 100 to provide information about this region.

In other implementations, other sensors 122 may be mounted elsewhere to determine falling edges. For example, the optical sensors 320 on the front of the robot 100 may have a FOV 124 that is directed downwards to allow for detection of the falling edge.

An output device 126, such as one or more undercarriage lights may be provided. For example, a light 368 may be arranged on an underside of the robot 100, proximate to or at a front edge.

Also depicted is the caster 110. In one implementation, caster 110 may be freewheeling, that is free to swivel about. In another implementation, the caster 110 may be driven, such that a motor or other actuator may change the direction of the caster 110 to facilitate steering of the robot 100.

Figure 9:
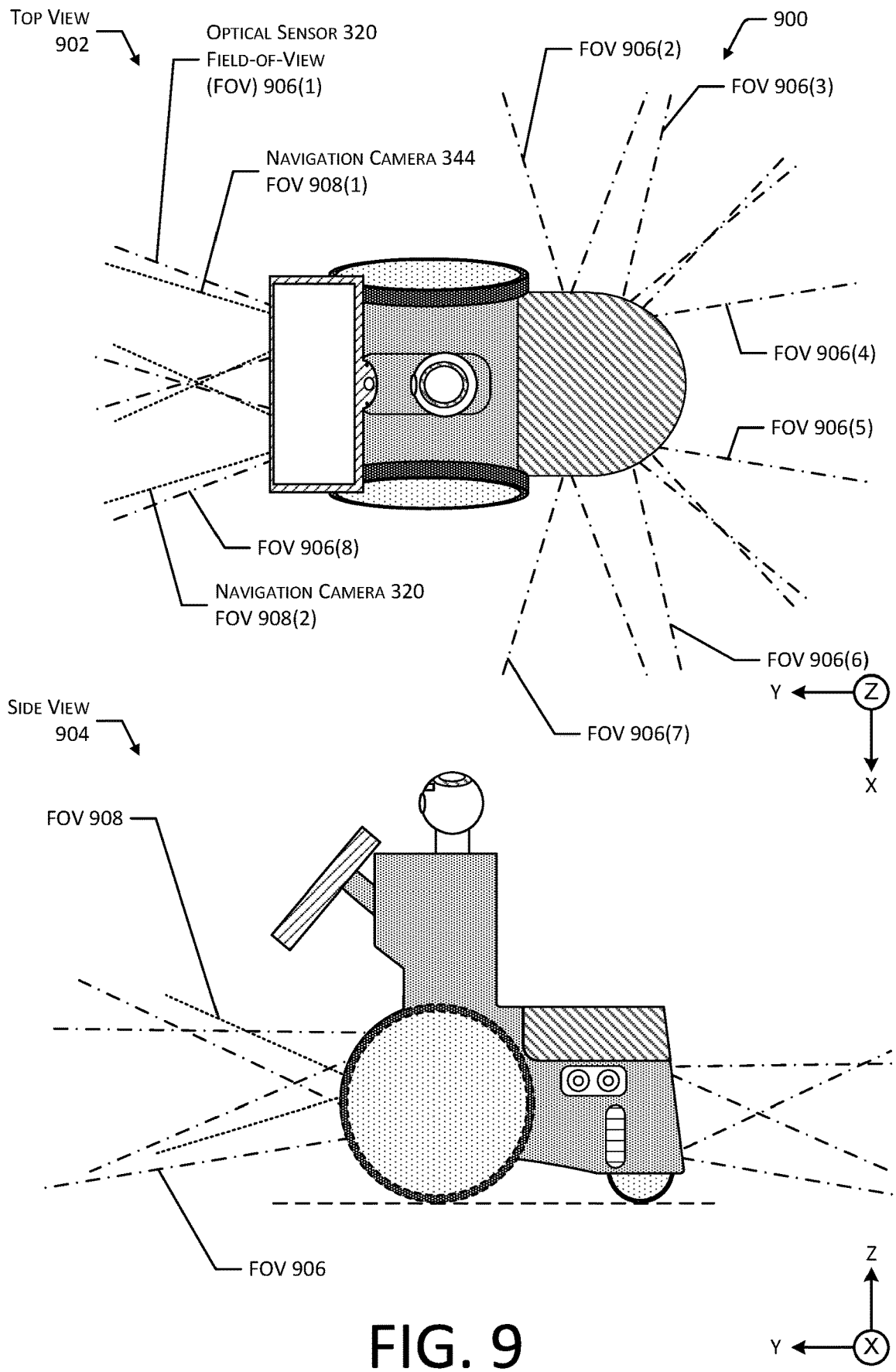
FIG. 9 depicts top and side views of the robot with the field-of-view (FOV) for several sensors, according to some implementations.

FIG. 9 depicts views 900 of the robot with the field-of-view (FOV) for several sensors, according to some implementations. Shown are a top view 902 and a side view 904 depicted within the views are optical sensor 320 field-of-view (FOV) 906 and the FOV 908 of the navigation cameras 344.

As illustrated here, the optical sensors 320 located along the lower edge of the front and the lower edge of the rear of the robot 100 have a FOV that is directed forward and includes at least a portion of the floor. By having a FOV that looks at the floor in front of the robot 100, the robot 100 is able to acquire data indicative of steps, ramps, obstacles, and so forth that are in the path of the robot 100. The optical sensors 320 located along the upper edges of the front and the rear the robot 100 have a field of view that is directed downward and includes at least a portion of the floor.

Not shown in this illustration of the fields view of the ultrasonic sensors 318. These may operate in conjunction with, or instead of the sensors 122 depicted here. For example, the ultrasonic sensor 318 mounted on the rear of the robot 100 provides object detection directly behind the robot 100 and provides coverage within an area not covered by the FOV 906 of the optical sensors 320 arranged on the rear of the robot 100.

Figure 10:
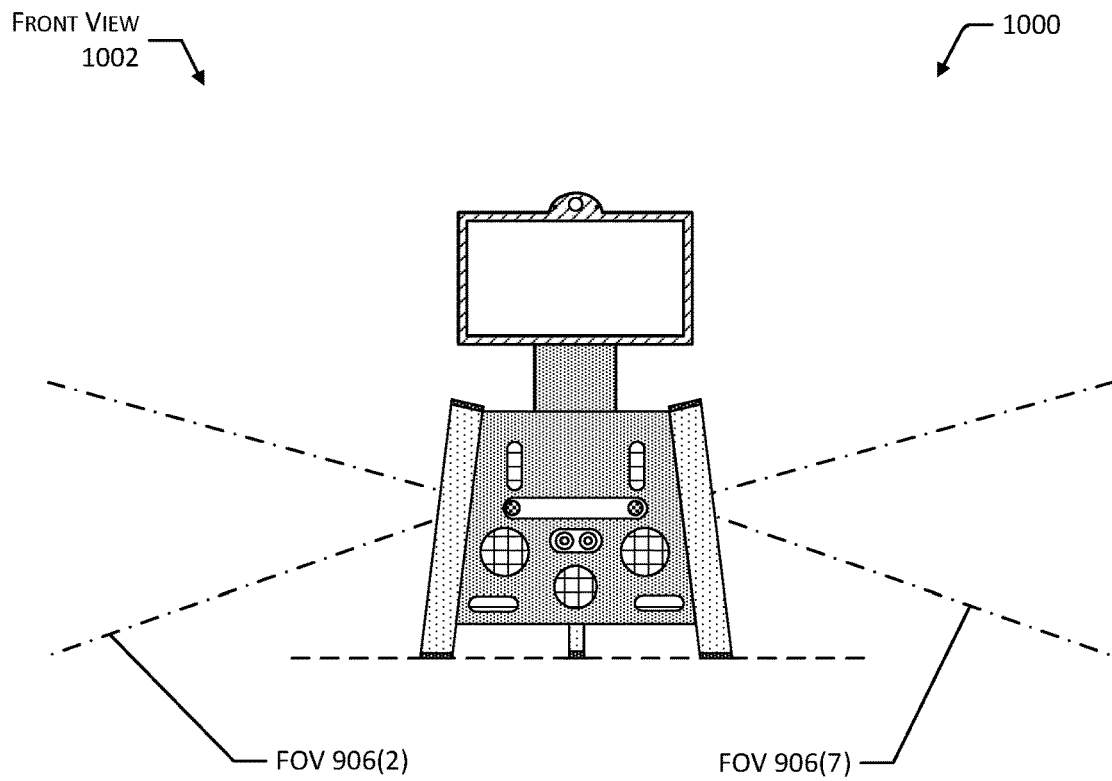
FIG. 10 depicts front and back views of the robot with the FOV for several sensors, according to some implementations.
Figure 10:
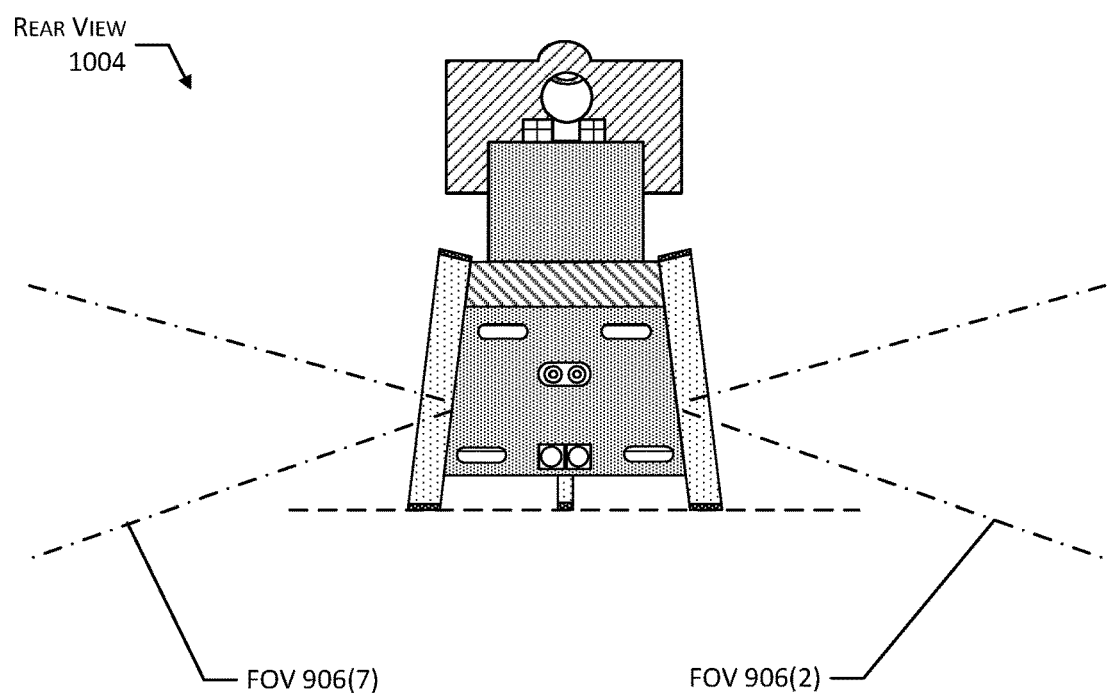

FIG. 10 depicts views 1000 that include a front view 1002 and a rear view 1004 of the robot 100 with the FOV for sensors 122 mounted on the left and right side, according to some implementations. Initial in these views, the FOV 906 for the optical sensors 320 extend to the left and the right of the robot 100.

Figure 11:
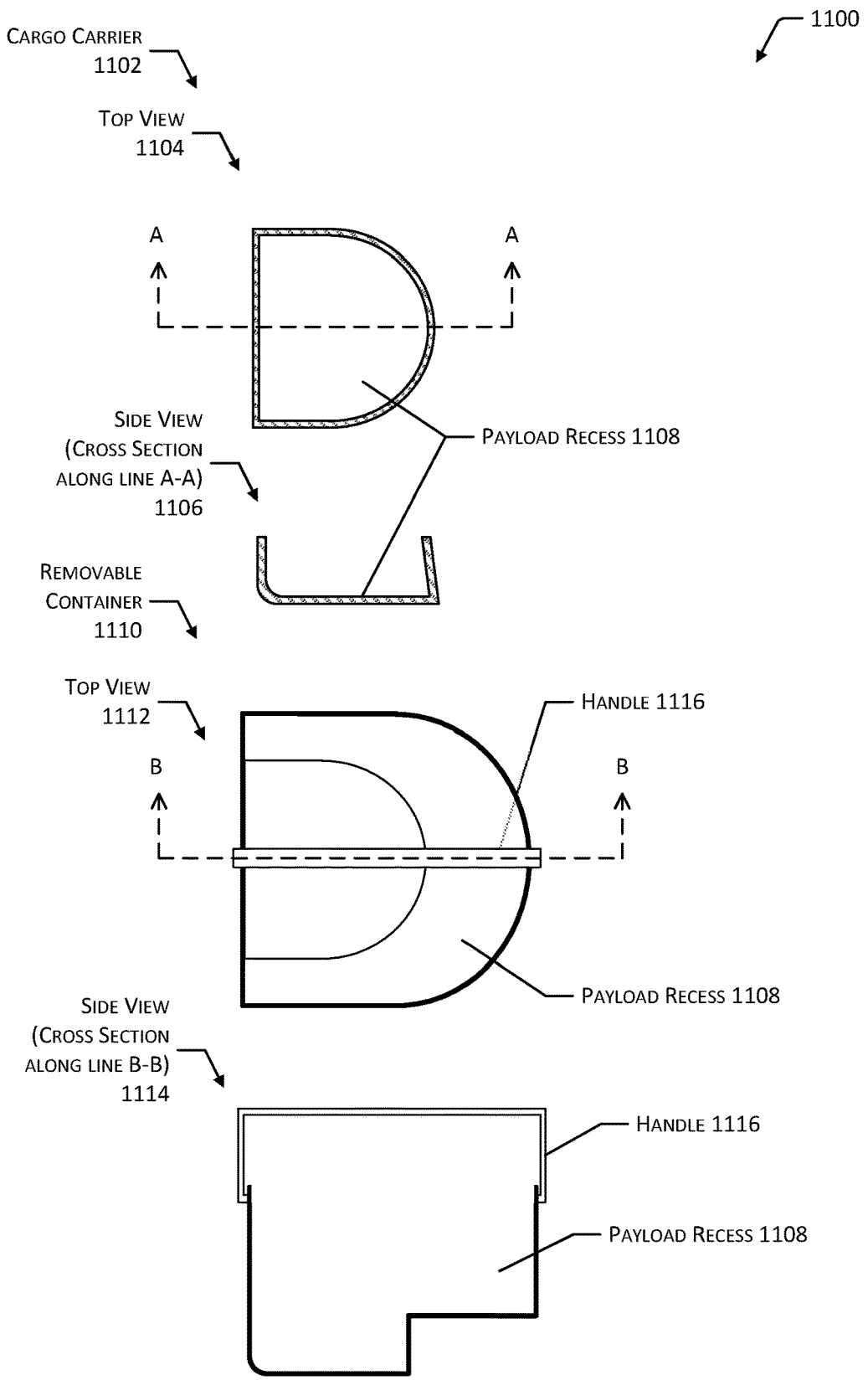
FIGS. 11-13 depict accessories that may be used in a modular payload bay of the robot, according to some implementations.
Figure 12:
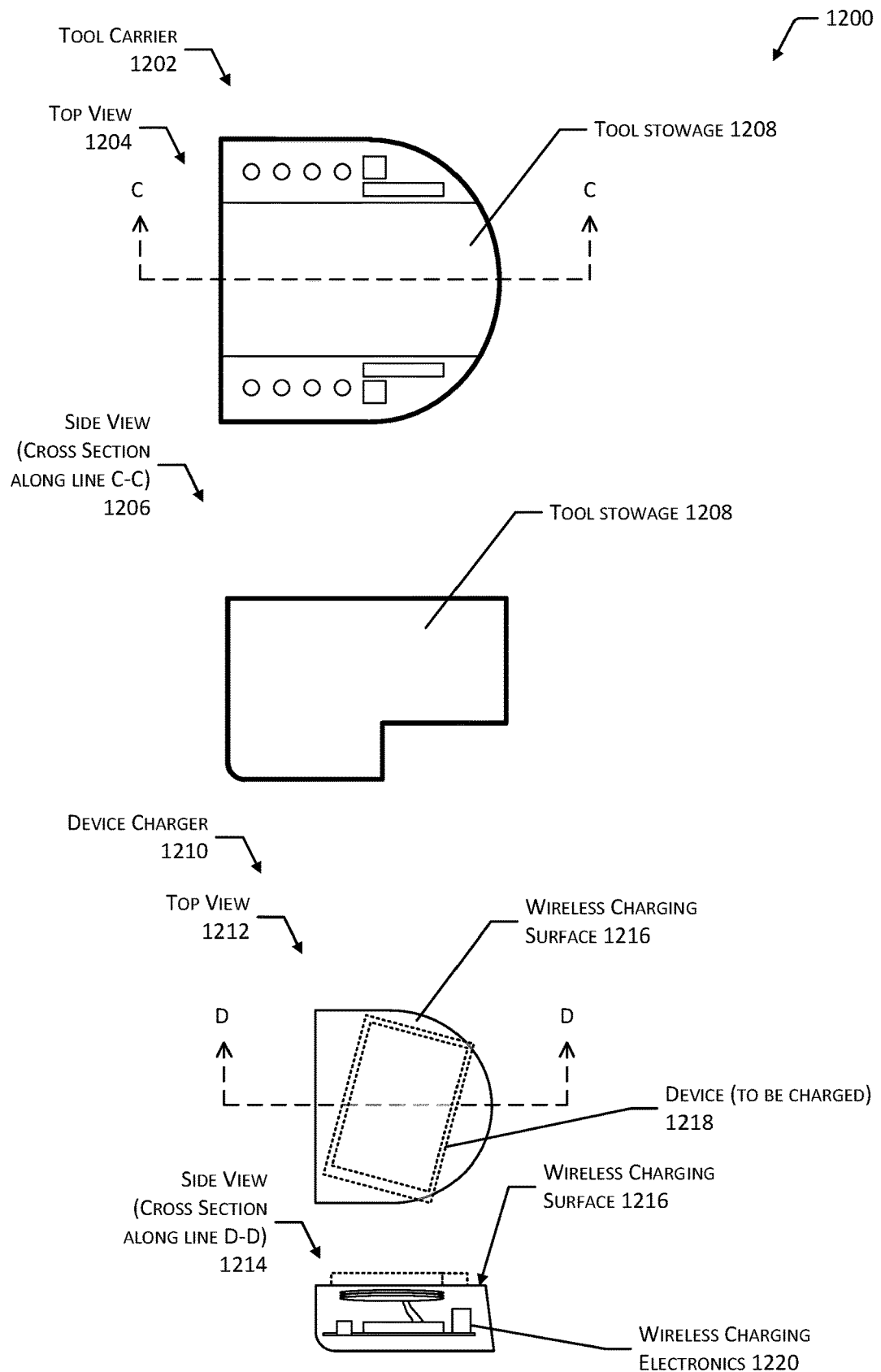
Figure 13:
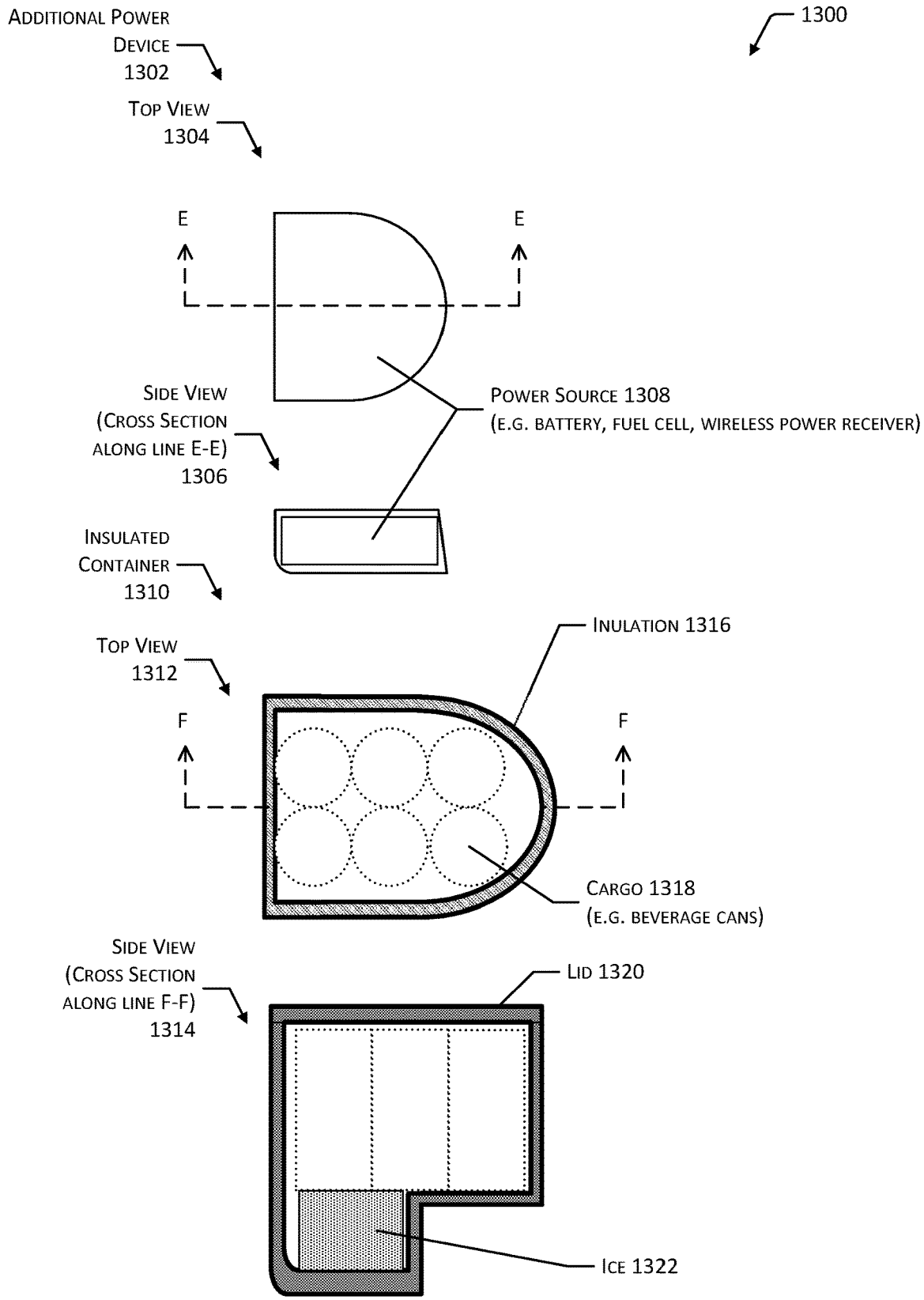

FIGS. 11-13 depict views 1100, 1200, and 1300, of accessories that may be used in a modular payload bay 112 of the robot 100, according to some implementations.

One accessory may comprise a cargo carrier 1102. A top view 1104 and a side view 1106 depicting a cross-section along line A-A are shown. The cargo carrier 1102 may include payload recess 1108 into which items may be at least partially placed for carriage by the robot 100.

A removable container 1110 may comprise a basket or bucket that may be mounted to the modular payload bay 112. A top view 1112 and a side view 1114 showing a cross section along line B-B are shown. The removable container 1110 includes payload recess 1108 and a handle 1116. For example, the user may use the handle 1116 to lift the removable container 1110 from the modular payload bay 112, and to subsequently carry the removable container 1110.

A tool carrier 1202 is depicted with the top view 1204 and a side view 1206 showing a cross-section along line C-C. The tool carrier 1202 may include tool storage 1208 configured to allow for carriage tools such as hand tools, electric drills, spare parts, and so forth.

Modular payload bay 112 may be used to hold a device charger 1210. A top view 1212 and a side view 1214 showing a cross section along line D-D are shown. The device charger 1210 may provide wireless charging service 1216 upon which a device 1218 to be charged may be placed. The wireless charging surface 1216 may wirelessly deliver electrical power to the device to be charged 1218 such as via induction or capacitive coupling. Within the device charger 1210 are wireless charging electronics 1220. In some implementations, the device charger 1210 may include an internal power supply, such as one or more batteries. In other implementations, the device charger 1210 may receive electrical power from one or more electrical connectors within the modular payload bay 112.

An additional power device 1302 may be used in modular payload bay 112. A top view 1304 and a side view 1306 showing a cross-section along line E-E are shown. A power source 1308 may be placed within the additional power device 1302. For example, the power source 1308 may comprise one or more of the battery, fuel cells, wireless power receiver, photovoltaic device, and so forth. The additional power device 1302 may be used to provide additional power to the robot 100.

An insulated container 1310 may be carried by the modular payload bay 112. The top view 1312 and a side view 1314 showing a cross section along line F-F are shown. The walls of the insulated container 1310 may comprise or include insulation 1316 that is designed to minimize thermal transfer between the contents of the insulated container 1310 in the external environment. Cargo 1318 such as beverage cans may be placed within the insulated container 1310, and a lid 1320 may be used to close the insulated container 1310. In some implementations, ice 1322 may be placed within the insulated container 1310 to help maintain a cooler temperature within the insulated container 1310. In other implementations, an active cooling system such as a thermoelectric cooler may be used to cool or heat the interior of the insulated container 1310. Power for the active cooling system may be drawn from one or more electrical contacts provided by the modular payload bay 112.

Other devices may be used in the modular payload bay 112. For example, the modular payload bay 112 may include a cup holder.

Figure 14:
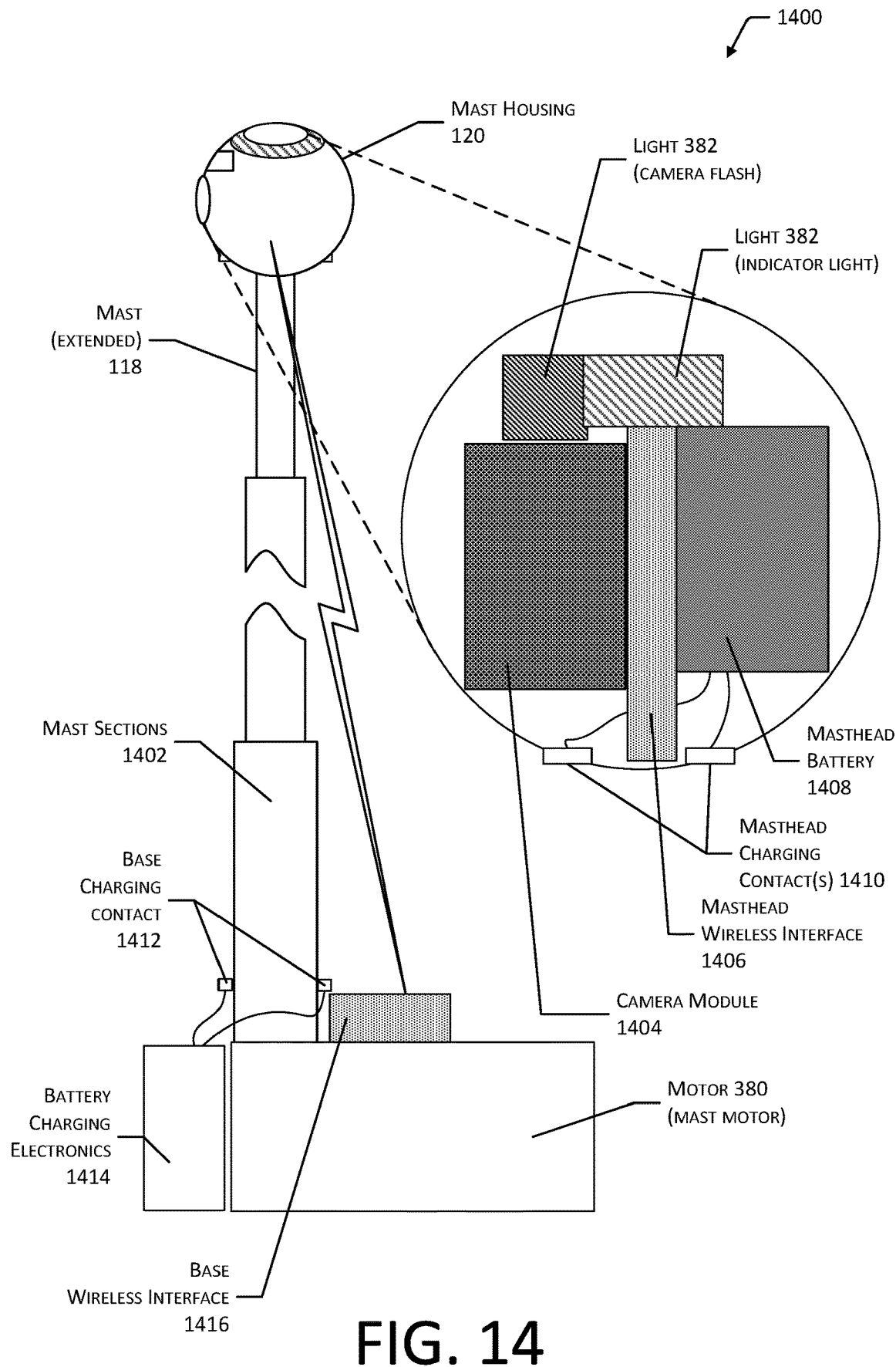
FIG. 14 depicts an extensible mast that utilizes wireless communication, according to some implementations.

FIG. 14 is a depiction 1400 of an extensible mast 118 that utilizes wireless communication, according to some implementations. In the implementation depicted here, communication between devices in the mast housing 120 and the structure of the robot 100 is provided via a wireless connection.

The mast 118 provides a vantage point for various sensors 122, output devices 126, and so forth to operate from. In one implementation, the height of the mast 118 when extended may be approximately 45 inches above the floor.

The mast 118 may comprise a plurality of mast sections 1402. The mast sections 1402 may nest successively within one another such that they may be retracted at least partially within one another when stowed. One or more motors 366, pneumatic actuators, or hydraulic actuators may be used to extend or retract the mast sections 1402.

In another implementation, the mast 118 may comprise one or more coiled strips. These strips may be uncoiled or coiled to deploy or retract, and when extended may exhibit a cross-section that minimizes flexure. For example, the strips may comprise a spring steel that when deployed exhibits a cross-section that is approximately "C" shaped. A pair of these strips may be provided back to back and joined together at the top of the mast 118, such as the base of the mast housing 120. Motors 366 may be used to extend or retract the coiled strips.

In another implementation, the mast 118 comprise a plurality of interlocking links. For example, the mast 118 may comprise a rigid belt actuator or zipper belt actuator that comprises a flexible belt and pinion device. A motor 366 spins the pinions, causing the belts may rotate 90°, interlocking load bearing blocks like a zipper into a rigid linear form. Other forms of rigid belt actuator may also be utilized. A flexible sheath such as a fabric outer covering or an accordion pleated tube may be used to protect the extended mast 118 from the exterior environment. For example, as the rigid belt actuator is extended, so to what an accordion pleated to be extended such that the rigid belt is concealed from view when extended.

The mast housing 120 may contain a variety of different components or devices. In this illustration, mast housing 120 includes camera module 1404, a masthead wireless interface 1406, a masthead battery 1408, and one or more masthead charging contact 1410. The camera module 1404 may comprise one or more cameras 344 and associated electronics. While the mast 118 is extended, the electronics within the mast housing 120 such as the camera module 1404, the masthead wireless interface 1406, the lights 368, and so forth, may draw their power from the masthead battery 1408.

When the mast 118 is retracted, the mast 118 and masthead charging contact(s) 1410 come into contact with corresponding base charging contacts 1412. The base charge contacts 1412 are in turn connected to a battery charging electronics 1414. Thus, when retracted, the battery charging electronics 1414 have an electrical pathway via the base charging contacts 1412 and the corresponding masthead charging contact(s) 1410 with which to provide electrical power to charge the masthead battery 1408.

When the mast is extended 118, the electronics within the mast housing 120 operate using power from the masthead battery 1408, and communication with the robot 100 is provided via a wireless link between the masthead wireless interface 1406 and the base wireless interface 1416. For example, the masthead wireless interface 1406 and the base wireless interface 1416 may utilize Wi Fi or Bluetooth Low Energy (BLE) to provide establish communication.

In other implementations, the mast 118 may be omitted and instead a free flying drone aircraft may be utilized. For example, the free flying drone may include electronics described above as being present within the mast housing 120; and may use one or more ducted fans to fly to a particular position during operation.

Figure 15:
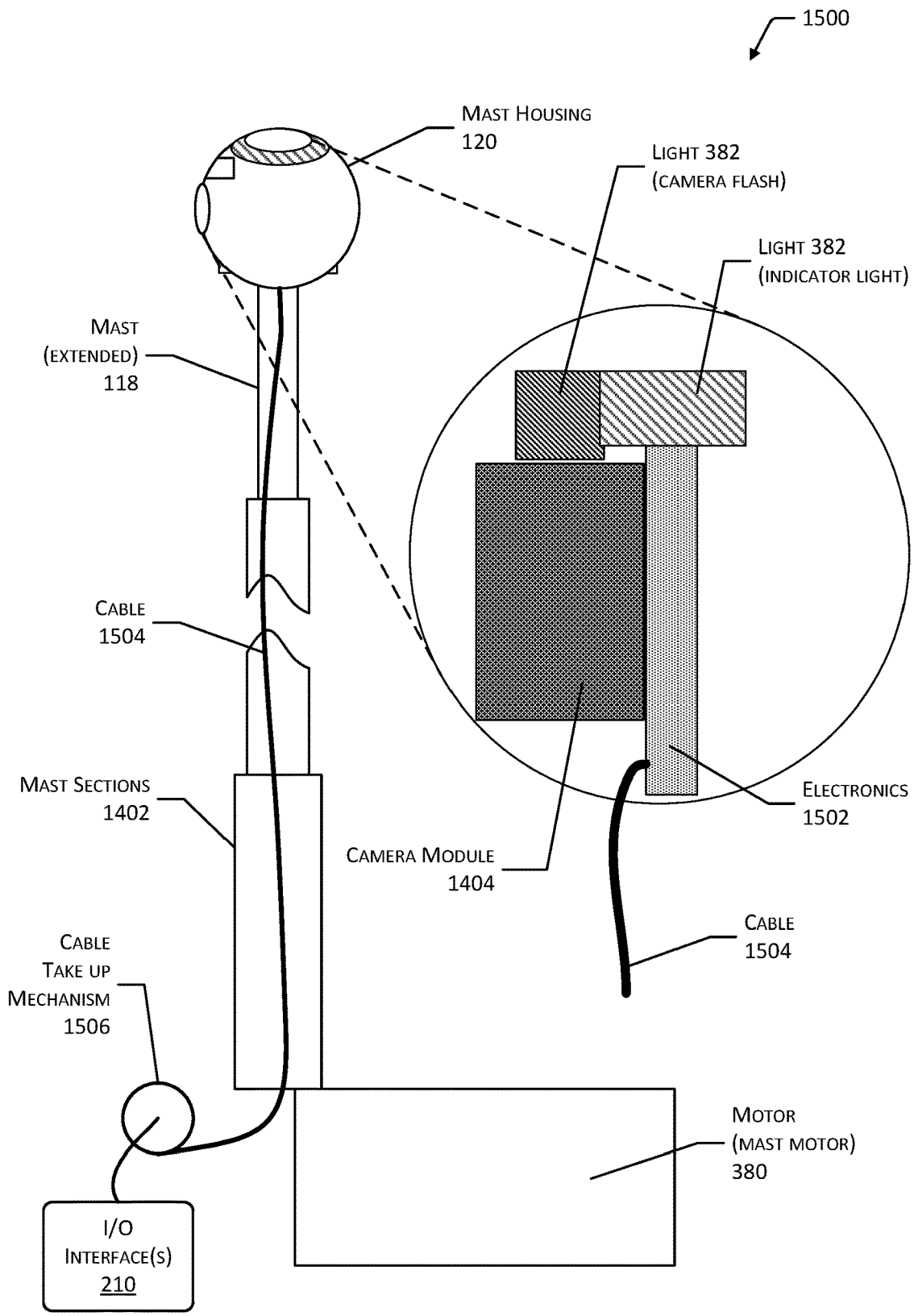
FIG. 15 depicts an extensible mast that utilizes a cable for communication, according to some implementations.

FIG. 15 depicts an extensible mast 1500 that utilizes a cable for communication, according to some implementations.

In this implementation, the mast housing 120 may include the camera module 1404, one or more lights 368, and other electronics 1502. Electronics 1502 are in communication with the rest of the robot 100 via a cable 1504. The cable 1504 may include one or more electrical conductors, fiber-optic fibers, electromagnetic waveguides, and so forth. Power to the electronics 1502 in the mast housing 120 may be provided via the cable 1504. Data may be exchanged to and from the electronic devices within the mast housing 120 via the cable 1504. The cable 1504 may extend within or alongside the mast 118. The cable take-up mechanism 1506 may comprise a motor 366, spring coil, or other mechanism that is designed to retract the cable 1504 during retraction on the mast 118 and dispense the cable 1504 during extension of the mast 118. The cable 1504 may couple to one or more of the I/O interfaces 210. For example, the cable 1504 may provide a USB connection to the electronics 1502 within the mast housing 120.

In another implementation, the cable 1504 may be omitted, and other electrically conductive pathways may be provided. For example, a surface of the mast 118 may include one or more electrical traces.

In still another implementation, a portion of the system to extend the mast 118 may include one or more conductors. For example, the mast 118 may be deployed by driving a semi-flexible pushrod such as a plastic rod into the mast 118.

One or more electrical traces, wires, waveguides, and so forth may be included within or on the surface of the push rod.

Figure 16:
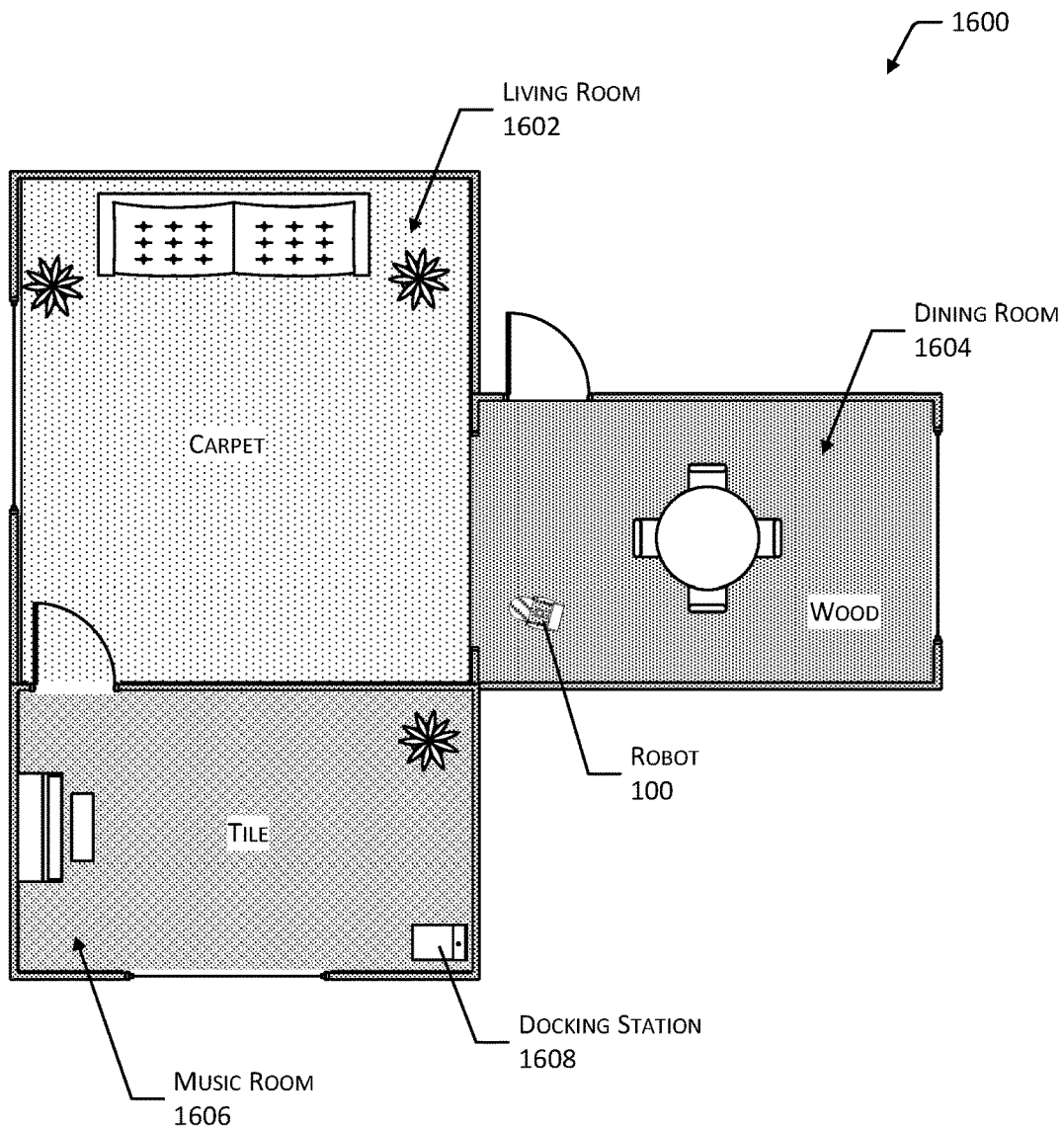
FIG. 16 depicts an environment and the associated floor characterization data, according to some implementations.

FIG. 16 depicts an environment 1600 and associated floor characterization data 238, according to some implementations. In this illustration, a portion of the home is depicted that includes 3 rooms: a living room 1602, a dining room 1604, and a music room 1606. Located within one quarter the music room 1606 is a docking station 1608. The docking station is discussed in more detail below with regard to FIG. 17.

During operation of the robot 100, floor characterization data 238 may be obtained. The floor characterization data 238 may be utilized by one or more of safety module 224, the autonomous navigation module 228, the task module 230, or other modules 256. For example, the floor characterization data 238 may be used to determine if an unsafe condition occurs such as a wet floor. In another example, the floor characterization data 238 may be used by the autonomous navigation module 228 assist in the determination of the current location of the robot 100 within the home. For example, if the autonomous navigation module 228 determines that the robot 100 is located in the dining room 1604, but the floor characterization data 238 indicates that the floors consistent with the living room 1602, an error condition may be generated in which other techniques are used to determine the location of the robot 100 or otherwise resolve the difference. For example, the robot 100 may attempt to return to the docking station 1608 and then, using information about the path traveled, determine the previously ambiguous location within the home.

The floor characterization data 238 may include one or more of a location designator 1610, floor type 1612, floor texture 1614, coefficient of friction 1616, surface resistivity 1618, color 1620, and so forth. The location designator 1610 may be specified based on input from the user. For example, the robot 100 may use speech synthesis to ask the user "what room is this?" during a training phase. The utterance of the user may be received by the microphone 346 array and the audio data 254 "this is the living room" may be processed and subsequently used to generate the location designator 1610. The floor type 1612 may comprise information indicative of the type of flooring associated with a particular location designator 1610. For example, the floor type 1612 may be indicative of types such as carpet, wood, tile, and so forth. The floor texture 1614 comprises information indicative of the surface texture of the floor, such as whether it is rough, smooth, medium, and so forth. The floor texture 1614 may be determined using data obtained from the FOMS 316. For example, the texture 1614 may be detectable by the FOMS 316. The coefficient of friction 1616 provide data indicative of how slippery the floor is. For example, a very low coefficient of friction 1616 is indicative of a slippery surface while high coefficient of friction 1616 is a surface in which slippage is minimal. In one implementation, the coefficient of friction 1616 may be determined based on data from a friction probe that is in contact with the floor. In another implementation, a predetermined amount of breaking or drag may be applied to one or more of the wheels 108 and the coefficient of friction 1616 may be determined based on previously defined parameters such as wheel resistance, amount of breaking applied, amount of power applied to drive wheels, and so forth. In effect, this implementation uses one of the wheels 108 to provide selective drag that is then used to determine the coefficient of friction 1616.

The surface resistivity 1618 comprises data indicative of the electrical resistivity of the surface. For example, surface resistivity 1618 may be measured between two or more of the conductive wheels 604 as described above. Different types of floor may exhibit different surface resistivity 1618, and changes in that surface resistivity 1618 may be used to indicate changing conditions. For example, a change in the surface resistivity 1618 for a particular portion of the floor may be indicative of the presence of water or other liquid on the floor.

The color 1620 of the floor may be determined using input from one or more of the cameras 344, the FOMS 316, and so forth. For example, one or more the navigation cameras 344 that are mounted on the front of the robot 100 may be used to acquire color data that is used to determine a color of the floor. In another example, where the FOMS 316 utilize optoelectronic devices that can determine different colors, output from the FOMS 316 may be used to provide the color 1620 data.

Figure 17:
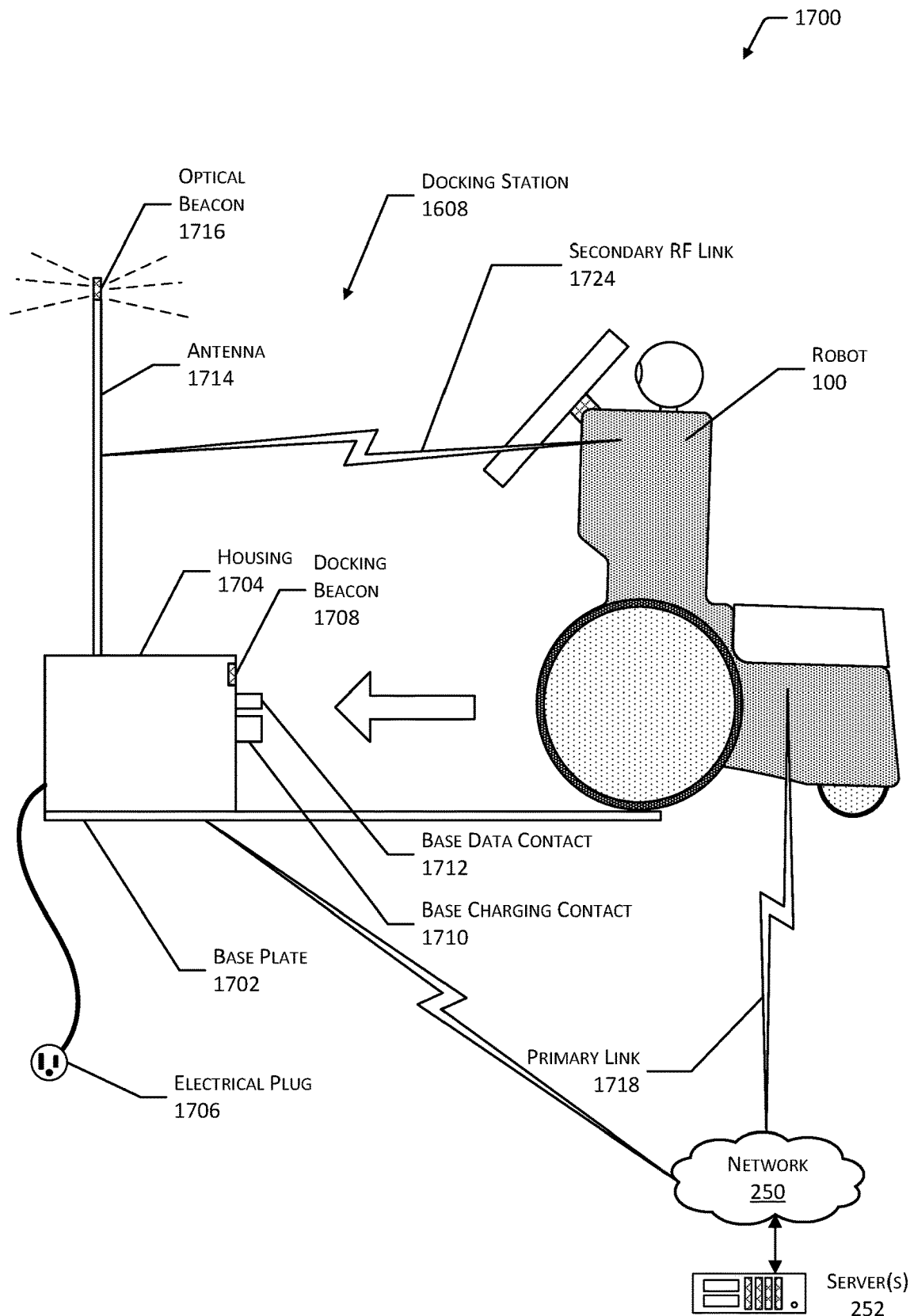
FIG. 17 depicts a diagram of a docking station with a secondary radio frequency link interface, according to some implementations.

FIG. 17 depicts a diagram 1700 of a docking station 1608 with a secondary RF link interface 306, according to some implementations. The docking station 1608 may comprise a base plate 1702. A housing 1704 may include electronics such as a power supply 202, one or more processors 204, one or more communication interfaces 208, and so forth. The docking station 1608 may obtain power from an electrical plug 1706. For example, the electrical plug 1706 may be plugged into a household electrical outlet. In some implementations, the docking station 1608 may include an uninterruptible power supply or alternative power source such as a fuel cell.

A docking beacon 1708 provides indicia suitable for guiding the robot 100 into the docking station 1608 at a predetermined location. At that predetermined location, the robot 100 may engage one or more base charging contacts 1710 or base data contacts 1712. For example, the robot charging contacts 602 may come in contact with the corresponding base charging contacts 1710 while the robot data contacts 606, the contact with the corresponding base data contacts 1712. In other implementations, one or more of the base charging contacts 1710 or the base data contacts 1712 may be along the base plate 1702, or otherwise configured to mate with corresponding robot charging contacts 602 or robot data contacts 606 located on an underside of the robot 100.

In other implementations, wireless power transfer may be used to charge the robot 100. For example, the base charging contacts 1710 may be omitted and a wireless inductive or wireless capacitive charging system may be used to provide electrical power to the robot 100.

The base charging contacts 1710 may be utilized to provide electrical power to charge the batteries on board the robot 100, supply power to the robot 100 for operation while docked, and so forth. The base data contacts 1712 may be used to provide data communication with the robot 100 while docked. For example, the base data contacts 1712 may be used to deliver updates to the instructions stored within the memory 216 of the robot 100.

The docking station 1608 may include an antenna 1714 suitable for use with one or more of the network interfaces 212. For example, the antenna 1714 may be used for the secondary RF link interface 306.

One or more optical beacons 1716 may be provided on the docking station 1608 to facilitate the robot 100 locating the docking station 1608 within the environment. For example, the optical beacons 1716 may be placed atop the antenna 1714 to provide and improve line of sight with the robot 100. In some implementations, the robot 100 may utilize the camera module 1404 in the mast housing 120 to detect the optical beacon 1716. For example, the mast 118 may be extended to increase the height of the mast housing 120 and the camera module 1404 therein. The increased height of the camera module 1404 combined with the location of the optical beacons 1716 atop antenna 1714 may provide an improved line of sight for the robot 100, facilitating locating of the docking station 1608 by the robot 100.

The robot 100 may utilize a primary link 1718 to establish communication with other devices such as the network 250, one or more servers 252, the docking station 1608, of the robot's 100, and so forth. For example, the primary link 1718 may comprise a Wi-Fi WLAN interface 302.

In some implementations, the primary link 1718 may be unavailable. For example, a portion of the home may have inadequate Wi-Fi coverage. As described above, the docking station 1608 may include a secondary RF link interface 306 that establishes a secondary RF link 1720 with the robot 100. In the event that a primary link 1718 is unavailable, the robot 100 may maintain communication with the docking station 1608 using secondary RF link 1720. The docking station 1608 may utilize one or more network interfaces 212 on board the docking station 1608 to establish communication with the network 250 or other devices. Continuing the example above, if the robot 100 finds itself in an area with inadequate Wi-Fi coverage, it may use the secondary RF link 1720 to access the docking station 1608 and then access an external server 252 via the docking station 1608.

In some implementations, the secondary RF link 1720 may also be used for navigational purposes. For example, secondary RF link 1720 may be used as a beacon to provide navigational input. In another example, the secondary RF link 1720 may be used to determine a distance from the docking station 1608. Continuing this example, the robot 100 may send a request to the docking station 1608 which then responds within a predetermined time. Based on the value of the predetermined time and the propagation delay associated with transmission, an estimated distance between the docking station 1608 and robot 100 may be determined.

The docking station 1608 may provide other functions as well. For example, the docking station 1608 may include additional resources such as processors, memory, and so forth that allow the docking station 1608 to provide various functions such as automated speech recognition, natural language understanding, and so forth. For example, if the robot 100 is unable to contact an external server 252 to process speech acquired using a microphone 346, the audio data 254 may be transmitted to the docking station 1608 for local processing by the docking station 1608. This may provide redundancy and still allow some functionality in the event that a wide area network connection, such as to the internet, is unavailable. In some implementations, the docking station 1608 may be configured to operate as an edge server to a network accessible resource, such as an external server.

Figure 18:
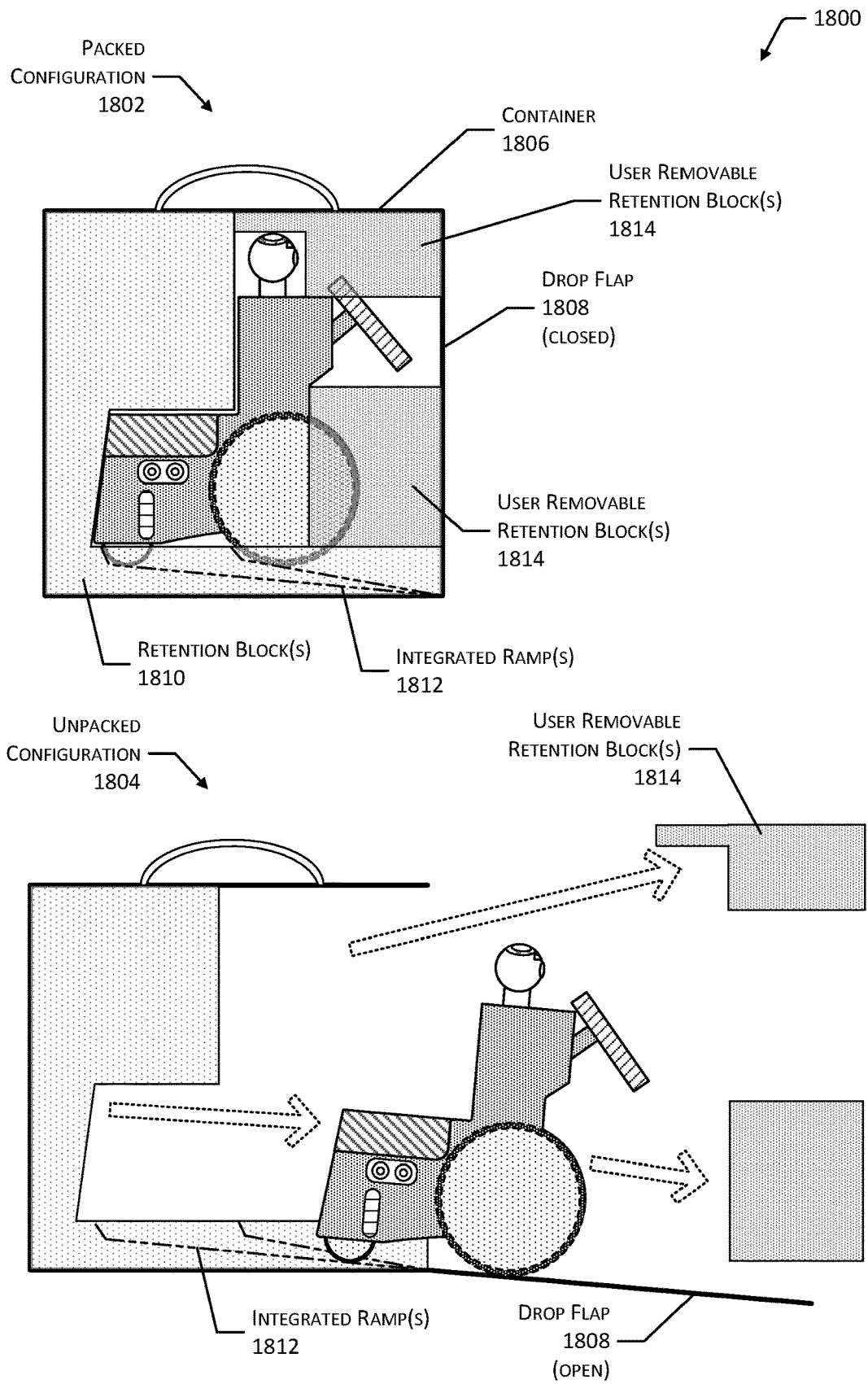
FIG. 18 depicts a scenario of a container within which the robot may be shipped and egress, according to some implementations.

FIG. 18 depicts a scenario 1800 of a container within which the robot 100 may be shipped and egress, according to some implementations. Depicted is the robot 100 and a packed configuration 1802 and in and unpacked configuration 1804. In the packed configuration 1802, a container 1806 contains the robot 100. The container 1806 comprises a plurality of sides and one of the sides comprises a drop flap 1808. The drop flap 1808 may be entirely removable, or may have a hinge at a bottom of the side. The robot 100 is protected within the container 1806 by retention blocks 1810. The retention blocks 1810 include one or more integrated ramps 1812 along which the wheels of the robot 100 may travel during egress. One or more user removeable retention blocks 1814 are positioned in front of the robot 100 and stabilize the robot 100 within the container 1806 during shipment. In the closed configuration, the drop flap 1808 at least partially maintains the user removeable retention blocks 1810 within the container 1806.

In the unpacked configuration 1804, the user removable retention blocks 1814 have been removed from in front of the robot 100. The robot 100 may then egress the container 1806 by driving down the one or more integrated ramps 1812. By using this technique, the user does not need to lift the robot 100 out of the container 1806.

The robot 100 may determine using the sensor data 234 that the user removeable retention blocks 1814 have been removed. For example, the sensor data 234 obtained from the ultrasonic sensor 318 on the front of the robot 100 may indicate that the user removeable retention blocks 1814 have been removed. In some implementations, the retention blocks 1810 may comprise an electrically conductive material; or may have a coating of electrically conductive material such as a metallic foil. The floor analysis sensor 356 may measure the electrical resistance and based on the low resistivity presented to 2 or more of the wheels 108 by the electrically conductive retention blocks 1810, the robot 100 may be able to determine that it is within the container 1806.

Once the robot 100 has determined that the user removeable retention blocks 1814 and been removed, the robot 100 may activate one or more of the drive motors 366 to drive the robot 100 out of the container 1806.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A robot comprising:
   a lower structure comprising:
      a pair of front wheels having a first diameter, each of the pair of front wheels having a wheel axle that is located forward of a center of gravity of the robot;
      a caster wheel located behind the center of gravity of the robot; and
      a modular payload bay configured to accept a modular payload unit;
   an upper structure comprising:
      a touchscreen display mounted to the upper structure via a moveable mount;
      an extensible mast having a mast housing at an uppermost end, wherein a camera is mounted within the mast housing;
      a carrying handle positioned above the center of gravity of the robot, wherein the carrying handle retracts at least partially within the upper structure; and
      an electrically operated mechanism to deploy the carrying handle to an extended position;
   one or more sensors;
   one or more memories storing first computer-executable instructions; and
   one or more processors to execute the first computer-executable instructions to:
      acquire sensor data from the one or more sensors;
      autonomously navigate within an environment using at least a portion of the sensor data;
      determine, using the one or more sensors, that the carrying handle has been deployed to the extended position; and
      inhibit operation of one or more motors of the robot responsive to the determination that the carrying handle has been deployed to the extended position.

2. The robot of claim 1, further comprising:
   the one or more memories storing second computer-executable instructions; and
   the one or more processors to execute the second computer-executable instructions to:
      determine the robot is to travel to a location on a different floor of the environment; and
      autonomously navigate to stairs leading to the different floor.

3. The robot of claim 1, further comprising:
   the one or more memories storing second computer-executable instructions; and
   the one or more processors to execute the second computer-executable instructions to:
      determine the extensible mast is deployed; and
      retract the extensible mast before the carrying handle is deployed to the extended position.

4. The robot of claim 1, wherein the pair of front wheels provide an electrically conductive path to a surface upon which the each of the pair of front wheels are in contact;
   the one or more sensors comprise circuitry to measure an electrical resistance between the pair of front wheels; and
   wherein the sensor data comprises information indicative of the electrical resistance of the surface as measured between the pair of front wheels.

5. A robot comprising:
   a structure;
   a plurality of wheels mounted to the structure;
   one or more drive motors to move one or more of the plurality of wheels;
   a carrying handle configured to retract at least partially within the structure;
   an electrically operated mechanism to deploy the carrying handle to an extended position for use;
   one or more mast motors;
   one or more base charging contacts located on the structure proximate to an extensible mast, wherein the one or more base charging contacts provide electrical power;
   a first wireless interface to provide wireless communication;
   the extensible mast having a mast housing proximate to an uppermost end of the extensible mast, the mast housing comprising:
      a second wireless interface to provide wireless communication with the first wireless interface;
      a masthead battery; and
      one or more masthead charging contacts electrically connected to the masthead battery, wherein the one or more masthead charging contacts establish electrical contact with the one or more base charging contacts when the extensible mast is retracted;
   one or more sensors comprising at least a floor analysis sensor;
   one or more memories storing first computer-executable instructions; and
   one or more processors to execute the first computer-executable instructions to:
      acquire sensor data from the one or more sensors, the sensor data comprising at least floor characterization data associated with an environment; and
      autonomously navigate the robot within the environment using at least a portion of the sensor data.

6. The robot of claim 5, further comprising:
   an interlock sensor to determine whether the carrying handle is deployed or stowed;
   the one or more memories storing second computer-executable instructions; and
   the one or more processors to execute the second computer-executable instructions to:
      acquire interlock data from the interlock sensor;
      determine, using the interlock data, that the carrying handle is deployed;
      inhibit operation of the one or more drive motors; and
      inhibit operation of the one or more mast motors.

7. The robot of claim 5, further comprising:
one or more rear wheels located proximate to a rear of the robot; and
a concavely contoured underbody that extends from a first height proximate to a front of the robot to a second height proximate to the one or more rear wheels, wherein the first height is greater than the second height.

8. The robot of claim 5, further comprising:
a modular payload bay located at least partially above a center of gravity of the robot, the modular payload bay comprising:
one or more mechanical engagement features to retain a payload accessory; and
one or more electrical connectors to provide one or more of power or data connectivity to the payload accessory.

9. The robot of claim 5, further comprising:
a first battery connected to the one or more drive motors or the one or more mast motors; and
a second battery connected to the one or more processors and at least a portion of the one or more sensors.

10. The robot of claim 5, wherein:
the one or more mast motors transition the extensible mast between one or more of a retracted state or an extended state.

11. The robot of claim 10, wherein the extensible mast comprises one or more of:
a plurality of nesting mast sections that are configured to retract at least partially within one another when stowed;
one or more coiled strips; or
a plurality of interlocking links.

12. The robot of claim 5, wherein two or more of the plurality of wheels provide an electrically conductive path to a floor that the two or more of the plurality of wheels are in contact with;
the at least the floor analysis sensor comprising circuitry to measure an electrical resistance between the two or more of the plurality of wheels; and
wherein the at least the floor characterization data comprises information indicative of the electrical resistance of the floor as measured between the two or more of the plurality of wheels.

13. The robot of claim 5, the one or more sensors further comprising a microphone array;
the one or more memories storing second computer-executable instructions; and
the one or more processors to execute the second computer-executable instructions to:
acquire raw audio data using the microphone array;
determine one or more audio feature vectors indicative of one or more features of the raw audio data;
process the one or more audio feature vectors to determine presence of a wakeword in the raw audio data; and
send one or more of the raw audio data or the one or more audio feature vectors to a server.

14. The robot of claim 5, wherein the one or more of the plurality of wheels provide an electrically conductive path to a floor that the one or more of the plurality of wheels are in contact with.

15. A system comprising:
a robot comprising:
a structure;
a plurality of wheels mounted to the structure;
one or more drive motors to move one or more of the plurality of wheels;
a carrying handle configured to retract at least partially within the structure;
an electrically operated mechanism to deploy the carrying handle to an extended position for use;
one or more sensors;
an extensible mast;
one or more mast motors to transition the extensible mast between one or more of a retracted state or an extended state;
a first power storage device to provide electrical power to at least the one or more drive motors and the one or more mast motors;
a second power storage device to provide electrical power to at least the one or more sensors;
one or more robot charging contacts connected to the first and second power storage devices;
a first communication interface using a first frequency range;
a second communication interface using a second frequency range less than the first frequency range;
one or more memories storing first computer-executable instructions; and
one or more processors to execute the first computer-executable instructions to:
actuate the electrically operated mechanism to deploy the carrying handle; and
a docking station comprising:
a power supply;
one or more base charging contacts connected to the power supply;
a third communication interface using the second frequency range;
one or more second memories storing second computer-executable instructions; and
one or more second processors to execute the second computer-executable instructions to:
establish communication with the robot using the third communication interface.

16. The system of claim 15, the electrically operated mechanism comprising one or more of a motor, solenoid, piezoelectric material, electroactive polymer, or shape-memory alloy.

17. The system of claim 15, wherein the extensible mast comprises a mast housing proximate to an uppermost end; and the robot further comprising:
the one or more memories storing third computer-executable instructions; and
the one or more processors to execute the third computer-executable instructions to:
actuate the one or more mast motors.

18. The system of claim 15, further comprising:
a container comprising:
a plurality of sides, wherein at least one of the plurality of sides comprises a drop flap having a hinge at a bottom of the at least one of the plurality of sides;
one or more retention blocks to retain the robot within the container, wherein the one or more retention blocks comprise one or more integrated ramps to allow travel of the plurality of wheels of the robot; and
one or more user removeable retention blocks to retain the robot within the container; and
the robot further comprising:
the one or more memories storing third computer-executable instructions; and the one or more processors to execute the third computer-executable instructions to:
  determine, while the robot is within the container, sensor data indicative of removal of one or more of the one or more user removable retention blocks from the container; and
  actuate the one or more drive motors to drive the robot out of the container.

19. A robot comprising:
a structure;
a plurality of wheels mounted to the structure;
one or more drive motors to move one or more of the plurality of wheels;
a carrying handle configured to retract at least partially within the structure;
an electrically operated mechanism to deploy the carrying handle to an extended position for use;
one or more mast motors;
an extensible mast having a mast housing proximate to an uppermost end of the extensible mast, wherein the extensible mast comprises one or more of:
  a plurality of nesting mast sections that are configured to retract at least partially within one another when stowed,
  one or more coiled strips, or
  a plurality of interlocking links;
one or more sensors comprising at least a floor analysis sensor;
one or more memories storing first computer-executable instructions; and
one or more processors to execute the first computer-executable instructions to:
  acquire sensor data from the one or more sensors, the sensor data comprising at least floor characterization data associated with an environment; and
  autonomously navigate the robot within the environment using at least a portion of the sensor data.

20. A system comprising:
a container comprising:
  a plurality of sides, wherein at least one of the plurality of sides comprises a drop flap having a hinge at a bottom of the at least one of the plurality of sides;
  one or more retention blocks to retain a robot within the container, wherein the one or more retention blocks comprise one or more integrated ramps to allow travel of a plurality of wheels of the robot; and
  one or more user removeable retention blocks to retain the robot within the container; and
the robot comprising:
  a structure;
  the plurality of wheels mounted to the structure;
  one or more drive motors to move one or more of the plurality of wheels;
  a carrying handle configured to retract at least partially within the structure;
  an electrically operated mechanism to deploy the carrying handle to an extended position for use;
  one or more sensors;
  an extensible mast;
  one or more mast motors to transition the extensible mast between one or more of a retracted state or an extended state;
  a first power storage device to provide electrical power to at least the one or more drive motors and the one or more mast motors;
  a second power storage device to provide electrical power to at least the one or more sensors;
  one or more first memories storing first computer-executable instructions;
  one or more first processors to execute the first computer-executable instructions to:
    actuate the electrically operated mechanism to deploy the carrying handle;
  one or more second memories storing second computer-executable instructions; and
  one or more second processor to execute the second computer-executable instructions to:
    determine, while the robot is within the container, sensor data indicative of removal of one or more of the one or more user removable retention blocks from the container; and
    actuate the one or more drive motors to drive the robot out of the container.

* * * * *

UNITED STATES PATENT AND TRADEMARK OFFICE
CERTIFICATE OF CORRECTION

PATENT NO. : 11,446,810 B1
APPLICATION NO. : 15/613916
DATED : September 20, 2022
INVENTOR(S) : Chua et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 519 days.

Signed and Sealed this
Eleventh Day of February, 2025

Coke Morgan Stewart
*Acting Director of the United States Patent and Trademark Office*